(12) United States Patent
Thangarasa et al.

(10) Patent No.: US 12,395,870 B2
(45) Date of Patent: Aug. 19, 2025

(54) SYSTEMS AND METHODS FOR VALIDATING PARAMETERS

(71) Applicant: Telefonaktiebolaget LM Ericsson (publ), Stockholm (SE)

(72) Inventors: Santhan Thangarasa, Vällingby (SE); Muhammad Ali Kazmi, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 537 days.

(21) Appl. No.: 17/638,881

(22) PCT Filed: Aug. 26, 2020

(86) PCT No.: PCT/IB2020/057989
§ 371 (c)(1),
(2) Date: Feb. 28, 2022

(87) PCT Pub. No.: WO2021/038472
PCT Pub. Date: Mar. 4, 2021

(65) Prior Publication Data
US 2022/0394519 A1 Dec. 8, 2022

Related U.S. Application Data

(60) Provisional application No. 62/892,300, filed on Aug. 27, 2019.

(51) Int. Cl.
*H04W 24/08* (2009.01)
*H04L 43/16* (2022.01)
(52) U.S. Cl.
CPC ............ *H04W 24/08* (2013.01); *H04L 43/16* (2013.01)

(58) Field of Classification Search
CPC . H04W 24/08; H04W 24/10; H04W 56/0045; H04W 72/0413; H04W 74/0833
See application file for complete search history.

(56) References Cited

U.S. PATENT DOCUMENTS

2020/0107283 A1* 4/2020 Ratasuk ............ H04L 27/2646
2020/0260397 A1* 8/2020 Vos .................. H04W 74/0833

FOREIGN PATENT DOCUMENTS

CN 109565426 A 4/2019

OTHER PUBLICATIONS

First Office Action for Chinese Patent Application No. 202080075199.8, mailed Nov. 7, 2023, 11 pages.
(Continued)

*Primary Examiner* — Michael Thier
*Assistant Examiner* — Prince A Mensah
(74) *Attorney, Agent, or Firm* — Withrow & Terranova, PLLC

(57) ABSTRACT

Systems and methods for validating one or more parameters are provided. In some embodiments, a method performed by a wireless device for validating parameters includes: obtaining information about measurement change for validating one or more parameters; obtaining information about a number of thresholds and associated thresholds used for validating the one or more parameters; and performing parameter validation based on the obtained information. In some embodiments, this is for a Timing Advance (TA) parameter for a Preconfigured Uplink Resources (PUR) transmission. In this way, TA validation becomes more reliable as the validation range can be adapted to the wireless device mobility.

26 Claims, 15 Drawing Sheets

(56) References Cited

OTHER PUBLICATIONS

Ericsson, "R4-1906795: Discussions on RRM requirements for transmissions using PUR for NB-I0T," 3GPP TSG-RAN WG4 Meeting #91, May 13-17, 2019, Reno, Nevada, 6 pages.
Ericsson, "R4-1909492: Remaining discussions on RRM requirements for NB-Iot PUR," 3GPP TSG-RAN WG4 Meeting #92, Aug. 26-30, 2019, 4 pages.
Huawei, et al., "R4-1909011: Discussion on the preconfigured UL resource," 3GPP TSG-RAN WG4 Meeting #92, Aug. 26-30, 2019, Ljubljana, Slovenia, 4 pages.
Sierra Wireless, "R1-1901629: NB-IOT Pre-configured UL Resources Design Considerations," 3GPP TSG RAN WG1 Meeting #96, Feb. 25-Mar. 3, 2019, Athens, Greece, 13 pages.
International Search Report and Written Opinion for International Patent Application No. PCT/IB2020/057989, mailed Nov. 24, 2020, 17 pages.
International Preliminary Report on Patentability for International Patent Application No. PCT/IB2020/057989, mailed Dec. 9, 2021, 28 pages.

\* cited by examiner

| Signaled parameter | Value of H2 [dB] |
|---|---|
| '000' | -6 |
| '001' | -4 |
| '010' | -2 |
| '011' | 2 |
| '100' | 4 |
| '101' | 6 |
| '110' | +7 |
| '111' | +8 |

When K<2: '000'–'101'
When K>=2: '000'–'111'

FIG. 8

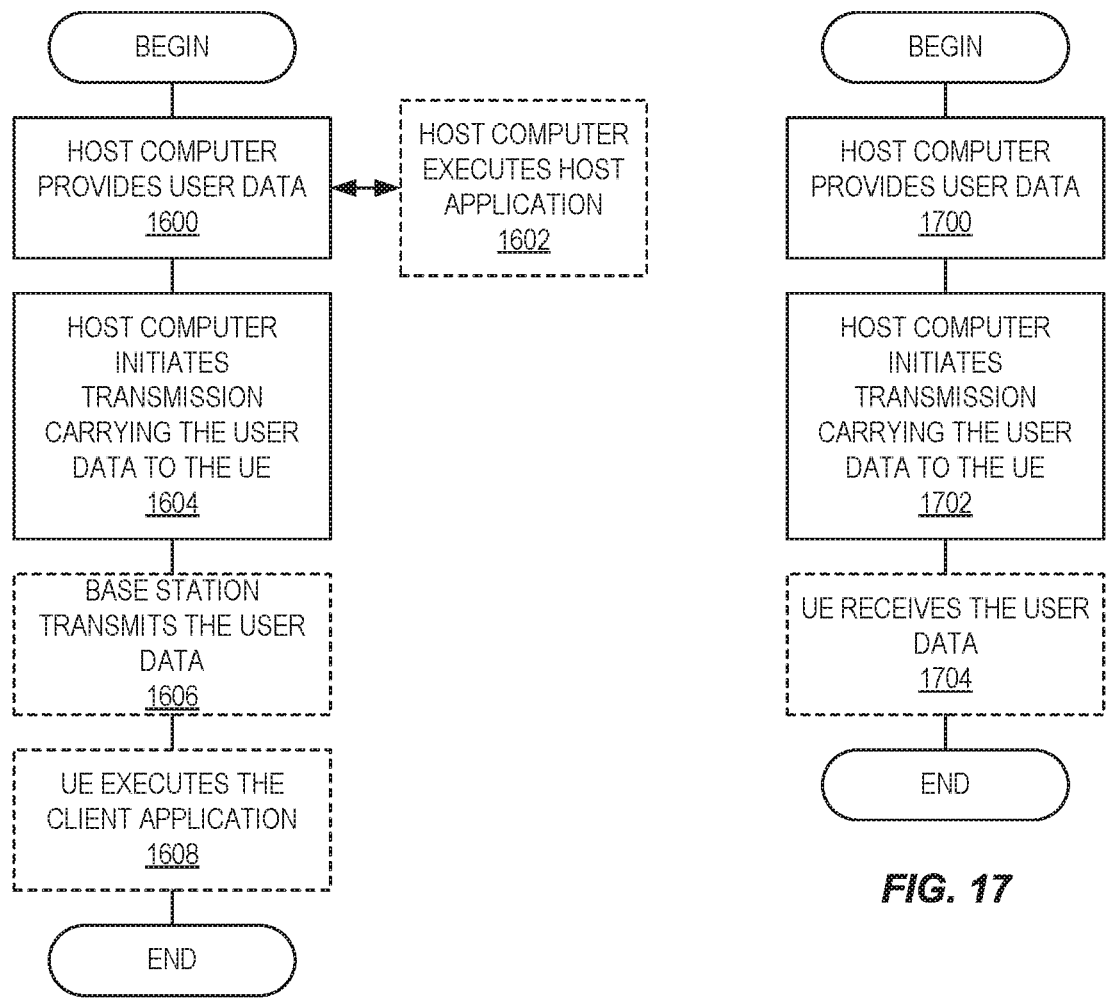

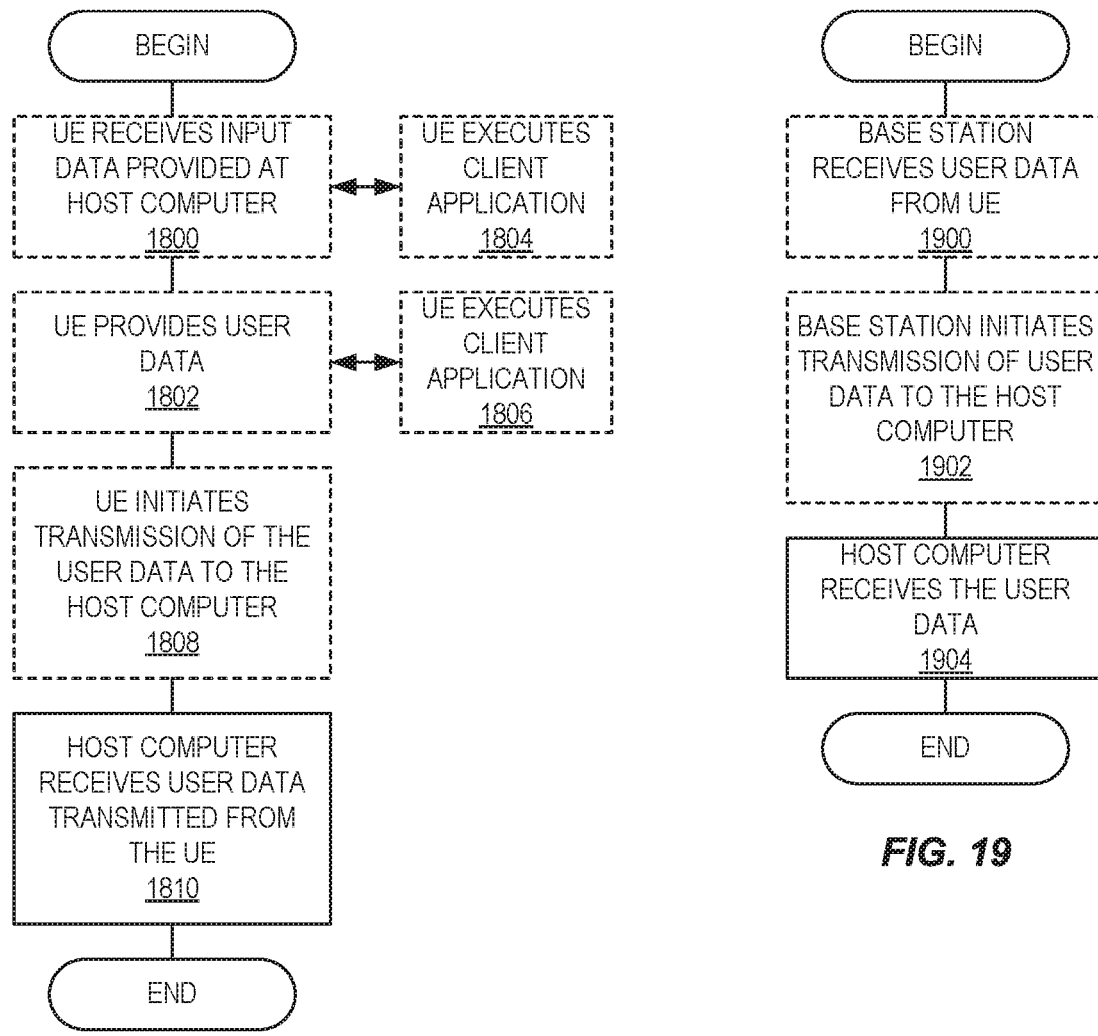

SYSTEMS AND METHODS FOR VALIDATING PARAMETERS

RELATED APPLICATIONS

This application is a 35 U.S.C. § 371 national phase filing of International Application No. PCT/IB2020/057989, filed Aug. 26, 2020, which claims the benefit of provisional patent application Ser. No. 62/892,300, filed Aug. 27, 2019, the disclosures of which are hereby incorporated herein by reference in their entireties.

TECHNICAL FIELD

The present disclosure relates to validating parameters.

BACKGROUND

The Long Term Evolution (LTE) enhancements introduced in 3GPP Releases 13, 14, and 15 for Machine Type Communication (MTC) are referred to herein as "eMTC", including (but not limited to), e.g., support for bandwidth limited User Equipments (UEs), Cat-M1, and support for coverage enhancements. This is to separate discussion from Narrowband Internet of Things (NB-IoT) (notation here used for any Release), although the supported features are similar on a general level.

There are multiple differences between "legacy" LTE and the procedures and channels defined for eMTC and for NB-IoT. Some important differences include a new physical channel, such as the physical downlink control channels, called Massive Physical Downlink Control Channel (MPDCCH) in eMTC and Narrowband Physical Downlink Control Channel (NPDCCH) in NB-IoT, and a New Physical Random Access Channel (NPRACH) for NB-IoT. Another important difference is the coverage level (also known as coverage enhancement level) that these technologies can support. By applying repetitions to the transmitted signals and channels, both eMTC and NB-IoT allow UE operation to decrease to a much lower Signal to Noise Ratio (SNR) level compared to LTE, i.e., Es/IoT≥−15 dB being the lowest operating point for eMTC and NB-IoT which can be compared to −6 dB Es/IoT for "legacy" LTE.

Transmission using preconfigured uplink resources: In a Release 16 work item on NB-IoT and eMTC enhancements, a new feature called transmission in Preconfigured Uplink Resources (PUR) in idle and/or connected mode is being introduced. The UE is allocated with PUR resources during a Radio Resource Control (RRC) connected state and is also assigned a Timing Advance (TA) value by the serving cell. The PUR resources can be of different types, namely dedicated, contention-free shared, or contention-based shared PUR resource. A PUR resource is defined as a Physical Uplink Shared Channel Resource e.g., (PUSCH) resource, i.e., it is a resource allocated in both time- and frequency domains. In the case of NB-IoT, a PUR resource is the same as a Narrowband Physical Uplink Shared Channel (NPUSCH) resource. For cat-M, it is the same as a PUSCH resource comprising 6 Physical Resource Blocks (PRBs) (e.g., for UE category M1) or 24 Resource Blocks (RBs) (e.g., for UE category M2). Analogous to PUSCH and NPUSCH, the repetitions can also be used for PUR transmissions, which is especially the case when operating under extended coverage.

The UE uses the preconfigured TA value when transmitting using the PUR resources in idle state, provided the serving cell does not change. If the serving cell changes, then the PUR resources and TA value from the old serving cell become invalid. In addition, the UE can also be configured to check the validity of the TA value based on the changes in the signal strength (e.g., Reference Signal Received Power (RSRP) in MTC or Narrowband Reference Signal Received Power (NRSRP) in NB-IoT). The UE is allowed to transmit using PUR only if the preconfigured TA value is valid. For example, if the magnitude of the difference between the measured signal strength (e.g., RSRP) at the time of transmission using PUR and the measured signal strength (e.g., RSRP) when the TA value was configured is below a certain threshold, then the UE assumes that the preconfigured TA value is valid. If the TA value is valid, then the UE is allowed to use the PUR resources for transmission; otherwise the UE should not carryout transmission using PUR.

In LTE, a Discontinuous Reception (DRX) cycle is used to enable a UE to save its battery. The DRX cycle is used in an RRC idle state, but it can also be used in an RRC connected state. Examples of lengths of DRX cycles currently used in an RRC idle state include 320 ms, 640 ms, 1.28 s and 2.56 s. Examples of lengths of DRX cycles currently used in an RRC connected state may range from 2 ms to 2.56 s. The enhanced DRX (eDRX) cycles are expected to be very long, e.g., ranging from several seconds to several minutes and even up to one or more hours. Typical values of eDRX cycles may be between 4-10 minutes.

The DRX cycle is configured by the network node and is characterized by the following parameters:

On duration: During the on duration of the DRX cycle, a timer called 'onDurationTimer', which is configured by the network node, is running. This timer specifies the number of consecutive control channel subframes (e.g., PDCCH, ePDCCH subframe(s)) at the beginning of a DRX Cycle. It is also interchangeably called a DRX ON period. More specifically, it is the duration in downlink subframes that the UE after waking up from DRX to receive control channel (e.g., PDCCH, enhanced PDCCH (ePDCCH)). If the UE successfully decodes the control channel (e.g., PDCCH, ePDCCH) during the ON duration, then the UE starts a DRX-inactivity timer (see below) and stays awake until its expiry. When the onDurationTimer is running, the UE is considered to be in DRX state of the DRX cycle.

DRX-inactivity timer: It specifies the number of consecutive control channel (e.g., PDCCH, ePDCCH) subframe(s) after the subframe in which a control channel (e.g., PDCCH) indicates an initial Uplink (UL) or Downlink (DL) user data transmission for this Medium Access Control (MAC) entity. It is also configured by the network node. When the DRX-inactivity timer is running, the UE is considered to be in non-DRX state i.e., no DRX is used.

Active time: This time is the duration during which the UE monitors the control channel (e.g., PDCCH, ePDCCH). In other words, this is the total duration during which the UE is awake. This includes the "on-duration" of the DRX cycle, the time during which the UE is performing continuous reception while the inactivity timer has not expired, and the time the UE is performing continuous reception while waiting for a DL retransmission after one Hybrid Automatic Repeat Request (HARQ) Round Trip Time (RTT). The minimum active time is equal to the length of an on duration, and the maximum active time is undefined (infinite).

The DRX ON and DRX OFF durations of the DRX cycle are shown in FIG. 1. The DRX operation with more detailed parameters in LTE is illustrated in FIG. 2.

DRX configuration herein may also be an enhanced or extended DRX (eDRX) configuration. In legacy DRX related procedures, the UE can be configured with a DRX cycle length of up to 2.56 seconds, but UEs supporting extended DRX (eDRX) can be configured with a DRX cycle at least longer than 2.56 seconds and typically much longer than 2.56 seconds, i.e., in order of several seconds to several minutes. The eDRX configuration parameters include an eDRX cycle length, paging window length, also known as a Paging Time Window (PTW) length etc. Within a PTW of the eDRX, the UE is further configured with one or more legacy DRX cycles.

SUMMARY

Systems and methods for validating one or more parameters are provided. In some embodiments, a method performed by a wireless device for validating parameters includes: obtaining information about a measurement change for validating one or more parameters; obtaining information about a number of thresholds (K) and associated thresholds used for validating the one or more parameters; and performing parameter validation based on the obtained information. In some embodiments, this is for a Timing Advance (TA) parameter for a Preconfigured Uplink Resources (PUR) transmission. In this way, TA validation becomes more reliable as the validation range can be adapted to the wireless device mobility.

In some embodiments, performing parameter validation comprises performing parameter validation based on a maximum allowed variation in signal strength ($\Delta SS_{max}$) in a serving cell. In some embodiments, $\Delta SS_{max}$ comprises one or more of a change in RSRP ($\Delta RSRP_{max}$) and a change in path loss ($\Delta PL_{max}$) In some embodiments, $\Delta SS_{max}$ can be derived using a first measurement, M1, and a second measurement, M2, using one or more functions such as: absolute difference between M1 and M2, magnitude of M1 and M2, fraction between M1 and M2, average, minimum, and maximum.

In some embodiments, obtaining information about a number of thresholds (K) comprises obtaining the information from a network node. In some embodiments, obtaining information about a number of thresholds (K) comprises obtaining the information by the wireless device based on predefined rule.

In some embodiments, the predefined rule comprises one or more of: K depends on a coverage enhancement level of the wireless device with respect to the serving cell (e.g., K=1 in normal coverage and K=2 in enhanced coverage); and K depends on a received signal level of the wireless device with respect to the serving cell (e.g., K=2 if SNR is less than or equal to SNR threshold and K=1 if SNR is above SNR threshold).

In some embodiments, values of K can be 1, 2, 3 etc. and each threshold is associated with a certain value range that the wireless device uses for validating the parameter.

In some embodiments, performing parameter validation comprises performing parameter validation based on: a first threshold (H1) which belongs to a first value range (R1) if K=1, (i.e., H1∈R1; and a second threshold (H2) and third threshold (H3) which belong to a second value range (R2) if K=2, (i.e., H2∈R2 and also H3∈R2.

In some embodiments, the actual value of the particular threshold is configured by the network node but it should belong to the value range associated with K. In some embodiments, only K is configured by the network node, but the actual value of the particular threshold is determined by the wireless device based on one or more criteria (e.g., TA value, DRX cycle, wireless device speed etc.).

In some embodiments, if the $\Delta SS_{max}$ (e.g., $\Delta RSRP_{max}$) fulfills the conditions on value range, then the TA is considered valid and the wireless device is allowed the carry out the PUR transmission, otherwise, the TA is considered invalid and the wireless device is not allowed to carry out the PUR transmission.

In some embodiments, a method performed by a base station for validating parameters includes at least one of: obtaining one or more configuration parameters that may affect the measurements of a wireless device; and configuring the wireless device with a number of thresholds and associated thresholds for validating one or more parameters. In some embodiments, the one or more parameters comprise a TA parameter for a PUR transmission.

Some embodiments of the present disclosure relate to the TA validation procedure for PUR transmission in the UE. More specifically, some embodiments relate to a scenario where the UE is configured with TA validation method using serving cell measurement change measurement change method. Examples of such measurements are signal strength measurements such as RSRP, NRSRP. The UE performs two measurements on the serving cell at different time instances for checking the validity of the TA before PUR transmission. The difference between the first (M1) and the second (M2) measurement is denoted as ΔRSRP. In one example ΔRSRP=M2−M1. In another example, ΔRSRP=M1−M2. The validation is performed by comparing ΔRSRP (or the magnitude of it) to 1 measurement threshold or by comparing ΔRSRP (or magnitude of it) with multiple thresholds (e.g., 2 thresholds). The number of thresholds used for validating the TA is denoted as K and the value of K is signaled by the network node.

According to a first aspect of an embodiment related to a wireless device (e.g., UE), the value range of each threshold depends on the number of thresholds with which the UE is configured to compare ΔRSRP (or magnitude of it) for validating TA. In some embodiments of the present disclosure, the value range of each threshold depends on K, i.e., the value range defines only the allowed threshold values which in turn depend on K.

In particular, when k=2 then the value range corresponding to at least a lower threshold may comprise at least one negative value; depending on the operational scenario, e.g., the geographical location of the UE, mobility type of the UE, direction of movement, the values in the second range can be selected by the network node. In one specific example, if the UE is moving further away from the serving network node, the range may comprise more values of negative character than in the reference range because as the UE moves away from the network node, the measurement level drops and the difference between M1 and M2 may increase. In yet another example, if the UE is moving towards the serving network node, the range may comprise more values of positive character than in the reference range because as the UE moves closer to the network node, the measurement also improves and therefore the measurement of M1 and M2 may become more similar. This is demonstrated in the two examples below.

In a first example, it is assumed that the serving network node has signaled K=1 which means that UE shall use only a single threshold (Threshold1) for validating the TA. In this case, the UE first determines the ΔRSRP based on a relation between M1 and M2 following a certain function. Examples of the function are an absolute difference between M1 and M2, a difference between M1 and M2, a fraction between M1 and M2, etc. The UE then compares ΔRSRP (or magnitude of it) to a first threshold (Threshold1) belonging to a first value range which can be either predefined in the specification or signaled by the serving network node. One example of comparison based on Threshold1 is shown below:

$$|\Delta RSRP| \leq Threshold1 \qquad (1)$$

In this first example, said TA is considered valid if ΔRSRP fulfills the condition in (1).

In a second example, it is assumed that the serving network node has signaled K=2 which means that the UE shall validate the TA using at least two thresholds (e.g., Threshold2 and Threshold3). In this case, the UE first determines the ΔRSRP based on a relation between M1 and M2 following a certain function. Examples of the function are an absolute difference between M1 and M2, a difference between M1 and M2, and a fraction between M1 and M2, etc. The UE then compares ΔRSRP to a second range which can be either predefined in the specification or signaled by the serving network node. One example of second range is shown below:

$$Threshold2 \leq \Delta RSRP \leq Threshold3 \qquad (2)$$

In this second example, the said TA is considered valid if ΔRSRP fulfills the condition in (2).

According to a second embodiment related to the network node (e.g., serving eNodeB), the network node obtains configuration parameters that may affect the measurements of the UE, and using that configuration for determining a suitable number of thresholds and value range for validating the TA prior to PUR transmission. The determined information is then communicated to the UE.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 8 illustrates a value range for TA validation using serving cell measurement change, according to some embodiments of the present disclosure;

FIGS. 16 through 19 are flowcharts illustrating methods implemented in a communication system, according to some embodiments of the present disclosure.

DETAILED DESCRIPTION

Figure 1:
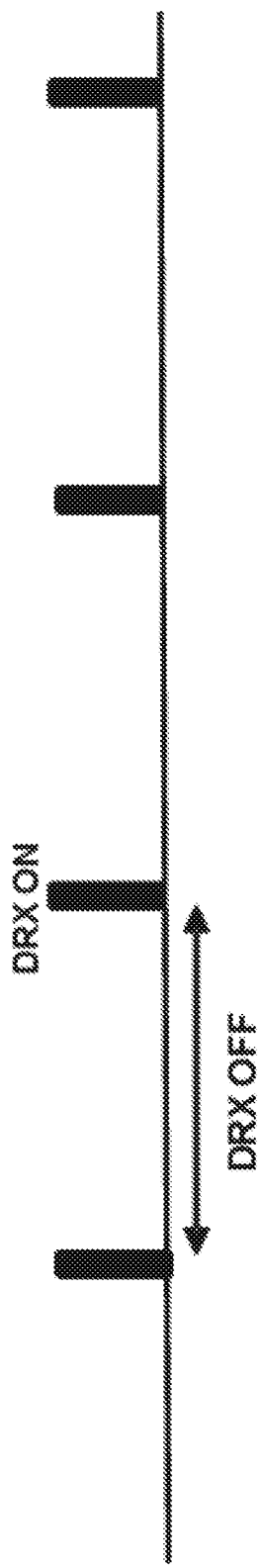
FIG. 1 illustrates the DRX ON and DRX OFF durations of the DRX cycle.
Figure 2:
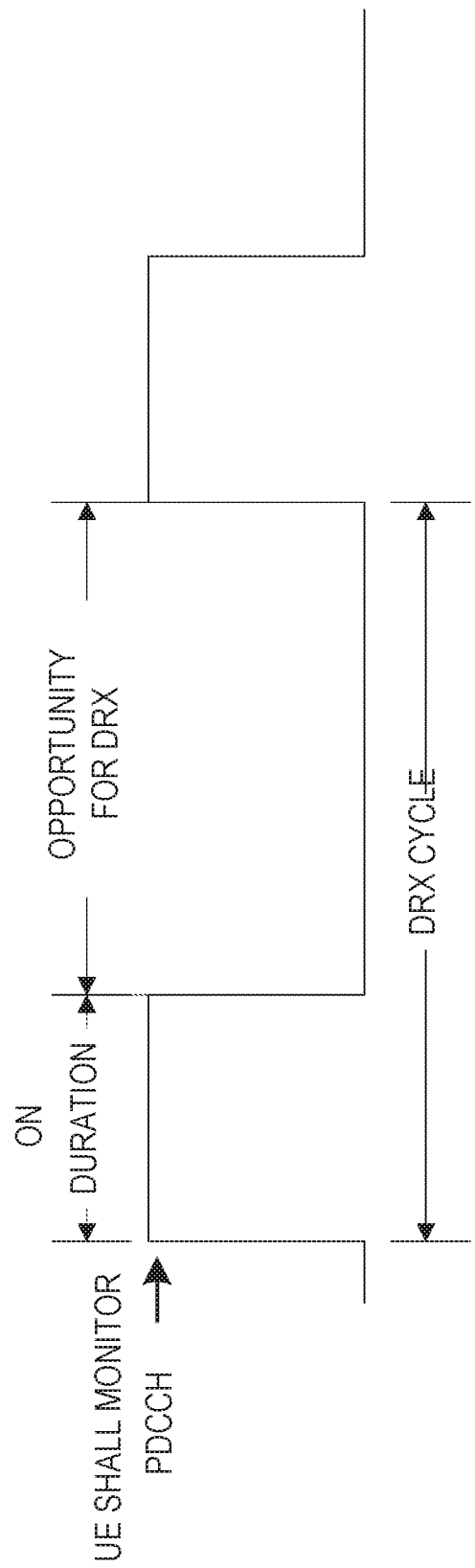
FIG. 2 illustrates DRX operation with more detailed parameters in LTE.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (PGW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 3:
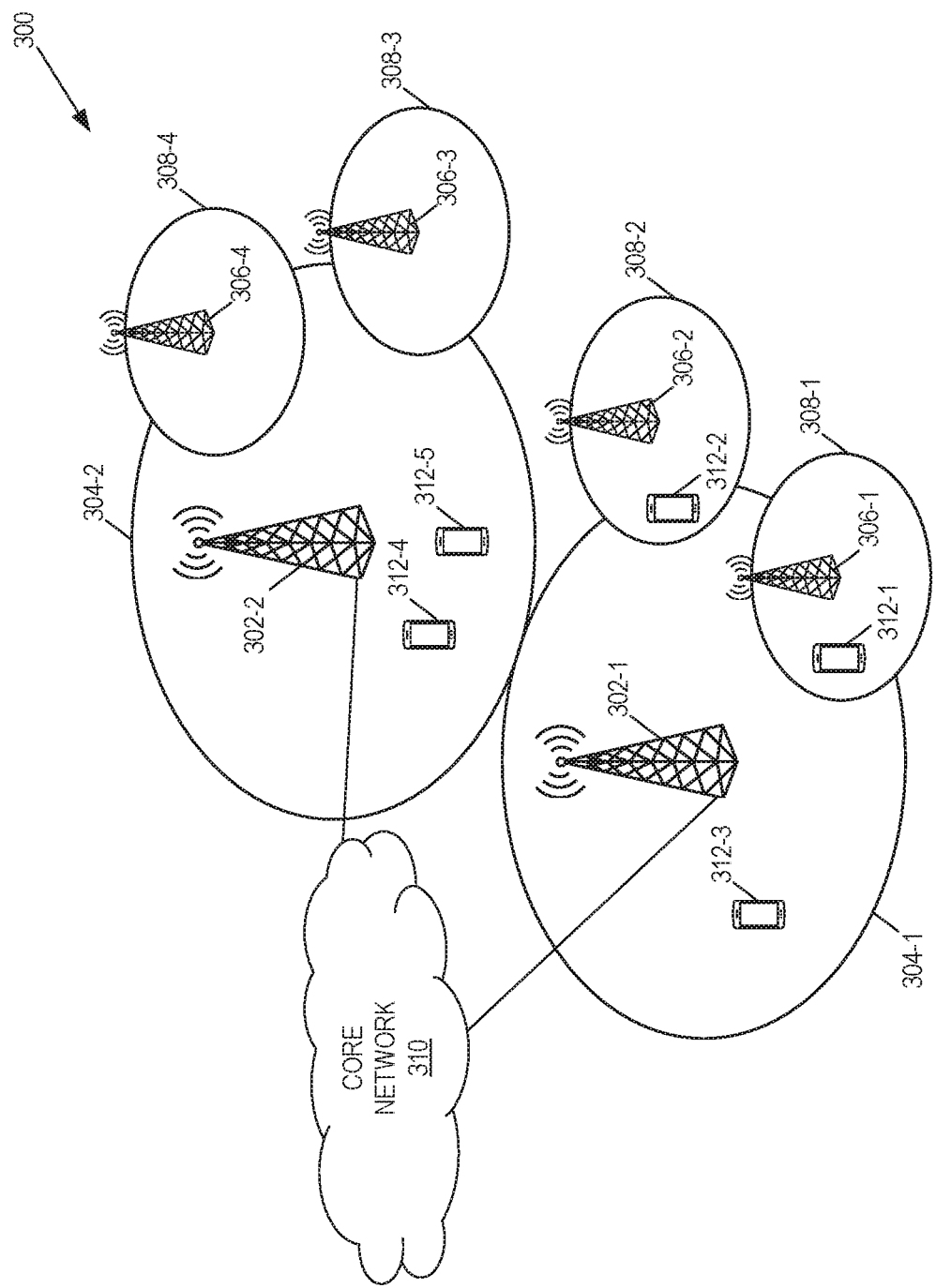
FIG. 3 illustrates one example of a cellular communications system in which embodiments of the present disclosure may be implemented.

FIG. 3 illustrates one example of a cellular communications system 300 in which embodiments of the present disclosure may be implemented. In the embodiments described herein, the cellular communications system 300 is a 5G system (5GS) including a NR Radio Access Network (RAN) or an Evolved Packet System (EPS) including an LTE RAN. In this example, the RAN includes base stations 302-1 and 302-2, which in LTE are referred to as eNBs and in 5G NR are referred to as gNBs, controlling corresponding (macro) cells 304-1 and 304-2. The base stations 302-1 and 302-2 are generally referred to herein collectively as base stations 302 and individually as base station 302. Likewise, the (macro) cells 304-1 and 304-2 are generally referred to herein collectively as (macro) cells 304 and individually as (macro) cell 304. The RAN may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The cellular communications system 300 also includes a core network 310, which in the 5GS is referred to as the 5G core (5GC). The base stations 302 (and optionally the low power nodes 306) are connected to the core network 310.

The base stations 302 and the low power nodes 306 provide service to wireless devices 312-1 through 312-5 in the corresponding cells 304 and 308. The wireless devices 312-1 through 312-5 are generally referred to herein collectively as wireless devices 312 and individually as wireless device 312. The wireless devices 312 are also sometimes referred to herein as UEs.

Figure 4:
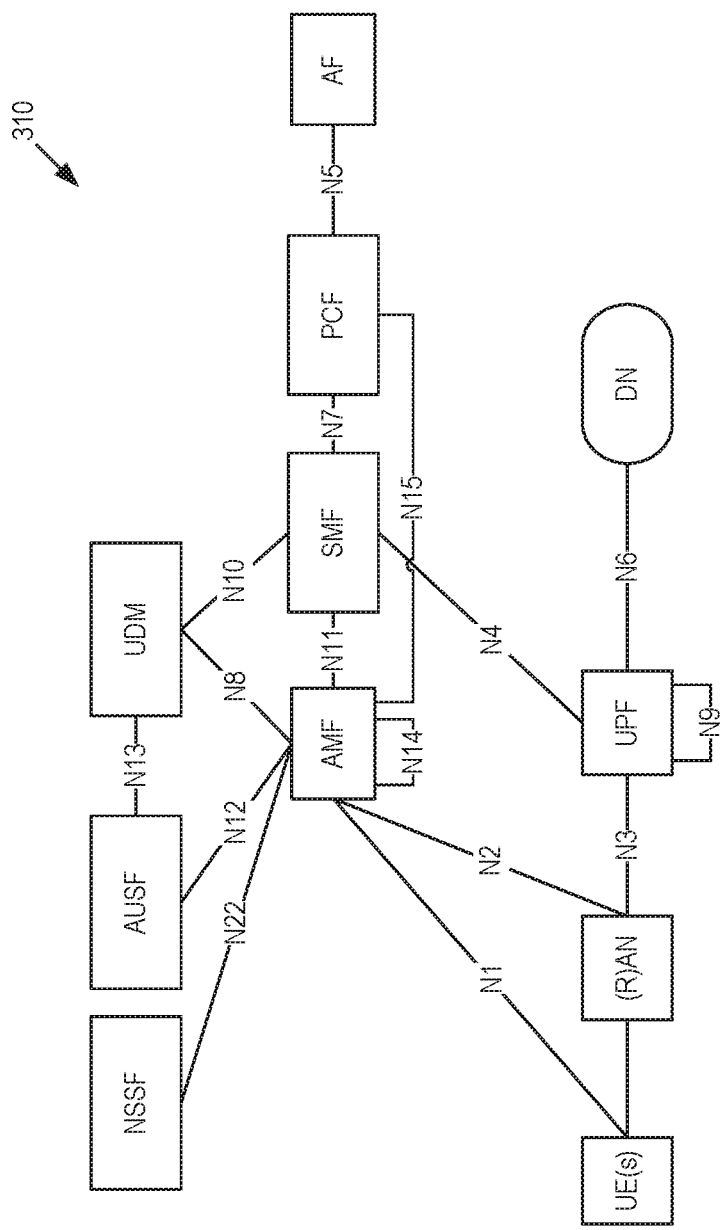
FIG. 4 illustrates a wireless communication system represented as a 5G network architecture composed of core Network Functions (NFs), where interaction between any two NFs is represented by a point-to-point reference point/interface.

FIG. 4 illustrates a wireless communication system represented as a 5G network architecture composed of core Network Functions (NFs), where interaction between any two NFs is represented by a point-to-point reference point/interface. FIG. 4 can be viewed as one particular implementation of the system 300 of FIG. 3.

Seen from the access side the 5G network architecture shown in FIG. 4 comprises a plurality of User Equipment (UEs) connected to either a Radio Access Network (RAN) or an Access Network (AN) as well as an Access and Mobility Management Function (AMF). Typically, the (R)AN comprises base stations, e.g., such as evolved Node Bs (eNBs) or NR base stations (gNBs) or similar. Seen from the core network side, the 5G core NFs shown in FIG. 4 include a Network Slice Selection Function (NSSF), an Authentication Server Function (AUSF), a Unified Data Management (UDM), an AMF, a Session Management Function (SMF), a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMP, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 4, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 4. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 5:
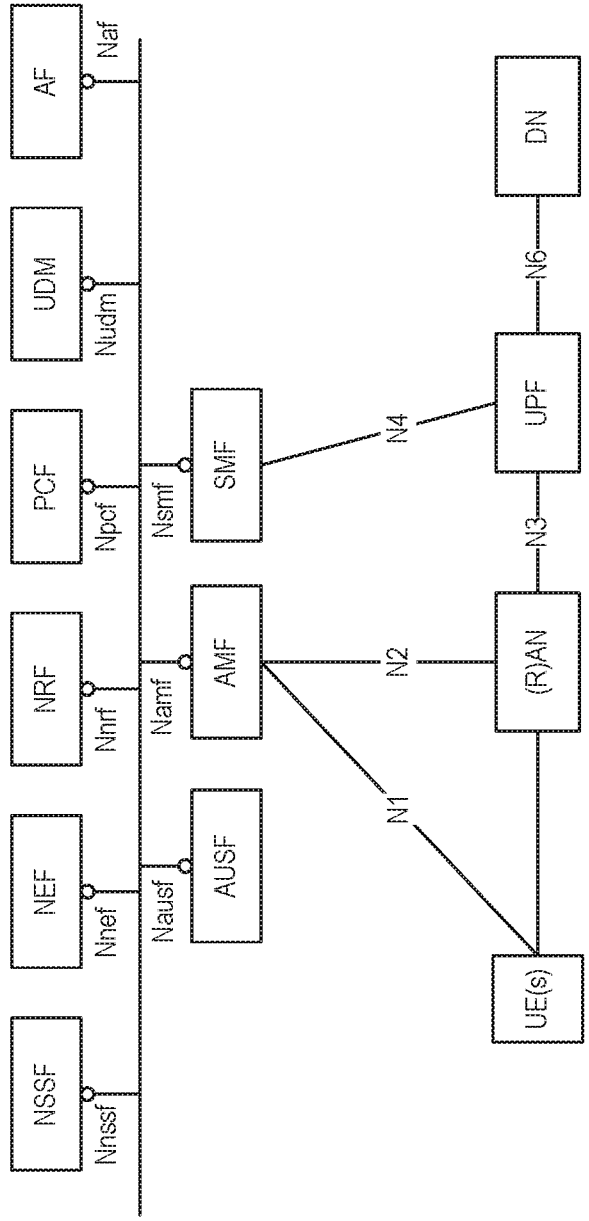
FIG. 5 illustrates a 5G network architecture using service-based interfaces between the NFs in the control plane, instead of the point-to-point reference points/interfaces used in the 5G network architecture of FIG. 4, according to some embodiments of the present disclosure.

FIG. 5 illustrates a 5G network architecture using service-based interfaces between the NFs in the control plane, instead of the point-to-point reference points/interfaces used in the 5G network architecture of FIG. 4. However, the NFs described above with reference to FIG. 4 correspond to the NFs shown in FIG. 5. The service(s) etc. that a NF provides to other authorized NFs can be exposed to the authorized NFs through the service-based interface. In FIG. 5 the service based interfaces are indicated by the letter "N" followed by the name of the NF, e.g., Namf for the service based interface of the AMF and Nsmf for the service based interface of the SMF etc. The Network Exposure Function (NEF) and the Network Function (NF) Repository Function (NRF) in FIG. 5 are not shown in FIG. 4 discussed above. However, it should be clarified that all NFs depicted in FIG. 4 can interact with the NEF and the NRF of FIG. 5 as necessary, though not explicitly indicated in FIG. 4.

Some properties of the NFs shown in FIGS. 4 and 5 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

In some embodiments a more general term "network node" is used and it can correspond to any type of radio network node or any network node, which communicates with a UE and/or with another network node. Examples of network nodes are NodeB, MeNB, SeNB, a network node belonging to a Master Cell Group (MCG) or Secondary Cell Group (SCG), base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, Remote Radio Unit (RRU), RRH, nodes in distributed antenna system (DAS), core network node (e.g., Mobile Switching Center, MME, etc), Operations & Maintenance, Operations Support System, Self-Organizing Network, positioning node (e.g., Evolved Serving Mobile Location Center (E-SMLC)), Minimization of Drive Tests, test equipment (physical node or software), etc.

In some embodiments the non-limiting term user equipment (UE) or wireless device is used, and it refers to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped, laptop mounted equipment, USB dongles, ProSe UE, Vehicle to Vehicle UE, Vehicle to X UE, etc.

The embodiments are described for LTE e.g., MTC and NB-IoT. However, the embodiments are applicable to any RAT or multi-RAT systems, where the UE receives and/or transmit signals (e.g., data) e.g., LTE Frequency Division Duplexing/Time Division Duplexing, Wideband Code Division Multiple Access/High Speed Packet Access, Global System for Mobile Communications/Global System for Mobile Communications Enhanced Data Rates for Global System for Mobile Communications Evolution Radio Access Network, Wi Fi, Wireless Local Area Network, Code Division Multiple Access 2000, 5G, NR, etc.

The term time resource used herein may correspond to any type of physical resource or radio resource expressed in terms of length of time. Examples of time resources are: symbol, mini-slot, time slot, subframe, radio frame, Transmit Time Interval (TTI), short TTI, interleaving time, etc.

With regard to the scenario comprising a UE served by a first cell (cell1), Cell1 is managed or served or operated by a network node (NW1) e.g., a base station. The UE operates in a certain Coverage Enhancement (CE) level with respect to a certain cell e.g., with respect to cell1. The UE is configured to receive signals (e.g., paging, Wake Up Signal, NPDCCH, MPDCCH, Narrowband Physical Downlink Shared Channel (NPDSCH), Physical Downlink Shared Channel (PDSCH) etc.) from at least cell1. The UE may further be configured performing one or more measurement on cell1 and one or more additional cells e.g., neighbor cells.

The UE may operate under different CE levels. The CE level of the UE can be defined with respect to any cell such as serving cell, a neighbor cell, a reference cell etc. For example, it can be expressed in terms of received signal quality and/or received signal strength at the UE with respect to a target cell on which the UE performs one or more radio measurements. Examples of signal quality are SNR, Signal to Interference plus Noise Ratio, Channel Quality Information, Narrowband Reference Signal Received Quality, Reference Signal Received Quality, Cell Specific Reference Signal (CRS) Ês/Iot, Shared Channel (SCH) Ês/Iot etc. Examples of signal strength are path loss, couple loss, RSRP, NRSRP, SCH_RP etc. The notation Ês/Iot is defined as ratio of:

Ês, which is the received energy per Resource Element (RE) (power normalized to the subcarrier spacing) during the useful part of the symbol, i.e., excluding the cyclic prefix, at the UE antenna connector, to Iot which is the received power spectral density of the total noise and interference for a certain RE (power integrated over the RE and normalized to the subcarrier spacing) as measured at the UE antenna connector The Coverage Enhancement (CE) level can be expressed in at least two different levels. Consider an example of two different CE levels defined with respect to signal quality (e.g., SNR) at the UE comprising of:

Coverage enhancement level 1 (CE1) comprising of SNR≥−6 dB at UE with respect to a cell; and Coverage enhancement level 2 (CE2) comprising of −15 dB≤SNR<−6 dB at UE with respect to a cell.

In the above example, the CE1 may also be interchangeably called as Normal Coverage Level (NCL), baseline coverage level, reference coverage level, basic coverage level, legacy coverage level etc. On the other hand, CE2 may be termed as Enhanced Coverage Level or Extended Coverage Level (ECL).

In another example, two different coverage levels (e.g., normal coverage and enhanced coverage) may be defined in terms of signal quality levels as follows:

The requirements for normal coverage are applicable for the UE category NB1 with respect to a cell provided that radio conditions of the UE with respect to that cell are defined as follows SCH Ês/Iot·−6 dB and CRS Ês/Iot·−6.

The requirements for enhanced coverage are applicable for the UE category NB1 with respect to a cell provided that radio conditions of the UE with respect to that cell are defined as follows SCH Ês/Iot·−15 dB and CRS Ês/Iot·−15.

In another example, one or more parameters defining CE of the UE with respect to a cell (e.g., serving cell, neighbour cell etc.) may also be signalled to the UE by the network node. Examples of such parameters are CE Mode A and CE Mode B signalled to UE category M1, UE category M2 etc. The UEs configured with CE Mode A and CE Mode B are also said to operate in normal coverage and enhanced coverage respectively. For example:

The requirements for CE Mode A apply provided the UE category M1 or UE category M2 is configured with CE Mode A, SCH Ês/Iot·−6 dB and CRS Ês/Iot·−6 dB.

The requirements for CE Mode B shall apply provided the UE category M1 or UE category M2 is configured with CE Mode B, SCH Ês/Iot·−15 dB and CRS Ês/Iot·−15 dB Prior to transmission, the UE is required to validate the received Timing Advance (TA) which is done using two Radio Resource Management (RRM) measurements; a first measurement performed around the time when TA was obtained and a second measurementperformed around the time when the validation is performed. The difference between the first and the second measurement is denoted as RSRP. The validation is performed by comparing the RSRP to at least one threshold, i.e., RSRP threshold. The number of thresholds used for validating the TA is denoted K and the value of K is signaled by the network node. The threshold values and its range are currently undefined.

Systems and methods for validating parameters are provided. In some embodiments, a method performed by a wireless device for validating parameters includes: obtaining information about measurement change for validating one or more parameters; obtaining information about a number of thresholds (K) and associated thresholds used for validating the one or more parameters; and performing parameter validation based on the obtained information. In some embodiments, this is for a TA parameter for a Preconfigured Uplink Resources (PUR) transmission. In this way, TA validation becomes more reliable as the validation range can be adapted to the wireless device mobility.

Figure 6:
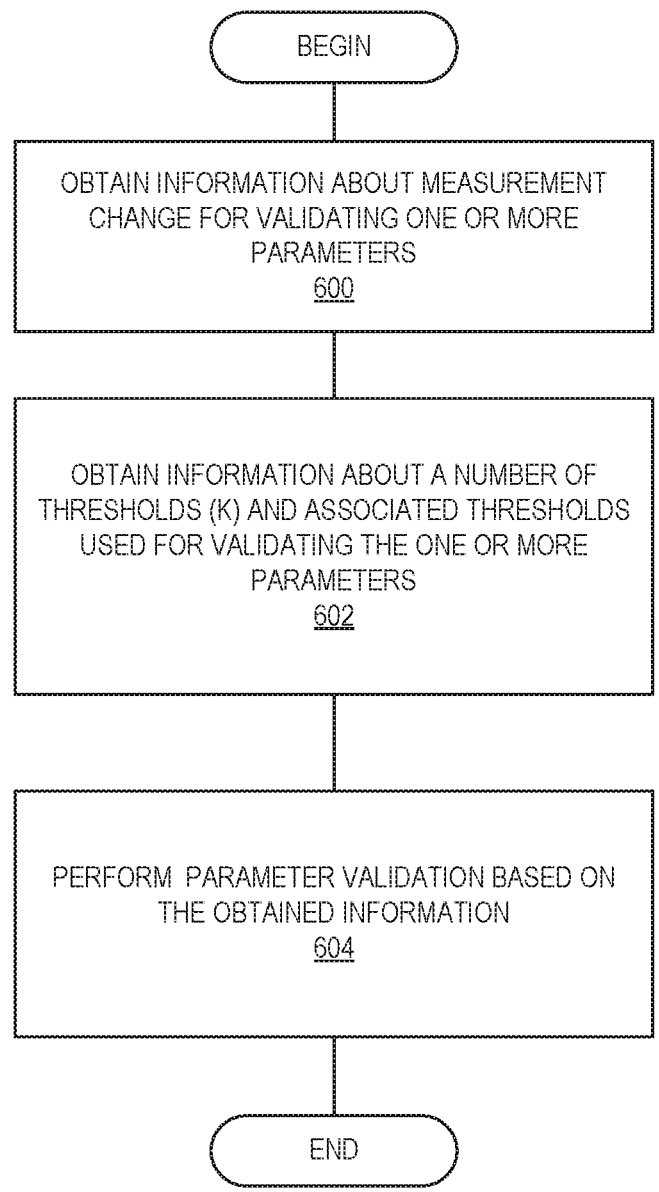
FIG. 6 illustrates a method performed by a wireless device for validating parameters, according to some embodiments of the present disclosure.

The steps included in some embodiments related to the wireless device (e.g., UE) which is operating under cell1 served by network node NW1. This is shown in FIG. 6 and summarized below. Systems and methods for validating parameters are provided. In some embodiments, a method performed by a wireless device for validating parameters includes at least one of: obtaining information about measurement change for validating one or more parameters (step 600); obtaining information about a number of thresholds (K) and associated thresholds used for validating the one or more parameters (step 602); and performing parameter validation based on the obtained information (step 604).

The steps involved in this UE embodiment are shown in FIG. 6 with additional details and can be summarized as follows:

Step 600: Obtaining information about measurement change for validating TA for PUR transmission Step 602: Obtaining information about the number of thresholds (K) and associated thresholds used for validating the TA Step 604: Performing TA validation based on the obtained information Step 600: In some embodiments of this step, the UE is obtaining information related to measurement change for validating the TA before it can carry out PUR transmission. The methods used for validating the TA are configured by the serving network node. Examples of methods that can be configured for TA validation are:

Serving cell changes
Time alignment timer (TAT) for IDLE mode
Serving cell signal (e.g., RSRP) changes Some embodiments of the present disclosure relate to the scenario where the UE is configured to validate the TA using serving cell measurement changes (third option in the list above). The TA validation method based on serving cell signal changes is described herein: This is based on a maximum allowed variation in signal strength (ΔSSmax) in the serving cell. Examples of ΔSSmax are change in RSRP (ΔRSRPmax), change in path loss (PL) (ΔPLmax) etc. More specifically, if the magnitude of the difference (ΔSS) between a measured signal strength (SSm) (e.g., PL, RSRP, NRSRP etc) compared to reference signal strength (e.g., SSref) value in a cell estimated by the UE is within certain threshold, as described in next step, then the configured TA is considered valid. The SSref can be based on a configured or predefined value or it can be based on the measurement performed by the UE in the serving cell e.g., RSRP etc. The UE may obtain SSref at certain time instance, T1, e.g., when receiving the TA from the serving cell. The UE may obtain SSm at another time instance, T2, e.g., before transmitting PUR in the serving cell.

In one example, SSm is referred to the RSRP (or NRSRP) measurement (denoted M1) that is performed by the UE on signals transmitted by the serving cell closely in time to T1, where T1 is T1 is assumed to be the reference time when the UE obtained the PUR configuration including the TA value. In another example, T1 corresponds to the time the UE obtains the updated TA from NW1; e.g., it can be obtained in the retransmission grant, or L1 ACK, or L2/L3 ACK, transmitted in response to the PUR transmission.

SSref is referred to the RSRP (or NRSRP) measurement (M2) that is performed by the UE on signals transmitted by the serving cell closely in time to T2, where T2 is the time when TA validation is actually performed by the UE. This means by time T2, M2 is already available and the filtered measurement is available for use prior to reference time T2.

ΔSSmax can be derived using M1 and M2 using different functions. Examples of the function are an absolute difference between M1 and M2, a magnitude of M1 and m2, a fraction between M1 and M2, average, minimum, maximum etc. as shown below:

$$\Delta SSmax=f(M1,M2) \text{ e.g., } K'=MEAN(M1,M2); K=abs(M1,M2) \text{ etc.}$$

One specific example of ΔSSmax is ΔRSRPmax.

Step 602: In some embodiments of this step, the UE is obtaining information about the number of thresholds (K) it shall use for validating the TA. In one example, this information is signaled by the network node to the UE. In another example, this information is obtained by the UE based on predefined rule. Examples of rules are:

K depends on a coverage enhancement level of the UE with respect to the serving cell e.g., K=1 in normal coverage and K=2 in enhanced coverage.

K depends on a received signal level of the UE with respect to the serving cell e.g., K=2 if SNR is less than or equal to SNR threshold and K=1 if SNR is above SNR threshold.

Examples of values of K are 1, 2, 3, etc. Each threshold is associated with a certain value range that UE uses for validating the TA.

The UE further obtains information about the value(s) of threshold(s) to be used by the UE for TA validation based on the change in the signal strength (e.g., based on ΔRSRP). In one example, this information is signaled by the network node to the UE. In another example, this information is obtained by the UE based on predefined rule.

In one example, the UE can be configured to carry out the TA validation based on:
- a first threshold (H1) which belongs to a first value range (R1) if K=1, i.e., H1∈R1
- a second threshold (H2) and third threshold (H3) which belong to a second value range (R2) if K=2, i.e., H2∈R2 and also H3∈R2

One specific example of the comparison of ΔRSRP with one threshold (with H1∈R1) or two thresholds (with H2∈R2 and also H3∈R2) is shown below:

$$|\Delta RSRP| \leq H1 \quad (3)$$

$$H2 \leq \Delta RSRP \leq H3 \quad (4)$$

In another example, the UE can be configured to carry out the TA validation based on:
- H1 which belongs to a first value range (R1) if K=1, i.e., H1∈R1
- H2 and H3 which belong to a third value range (R3) and fourth range value respectively (R4) if K=2, i.e., H2∈R3 and H3∈R4

Another example of the comparison of ΔRSRP with one threshold (with H1∈R1) or two thresholds (with H2∈R3 and also H3∈R4) is shown below:

$$|\Delta RSRP| \leq H1, \text{ when } K=1 \quad (5)$$

$$H3 \leq \Delta RSRP \leq H4, \text{ when } K=2 \quad (6)$$

The difference between the conditions in (4) and (6) is that the range between the maximum and the minimum (H2 and H3) is different. Moreover, in (6), different resolutions between the values can be used with more flexibility compared to condition in (4), e.g., between H2 and H3 compared to H3 and H4.

The value ranges differ with respect to each in terms of at least one of: maximum value, minimum value, range between maximum and minimum value and resolution between the values.

Examples of different value ranges are:
R1=[2, 3, 4, . . . , 8] dB
R2=[−2, −1, 0, 1, 2, 3, . . . 8] dB
R3=[−2, −1, 0, 1, 2, 3, 4] dB
R4=[4, 5, . . . , 8] dB In one example, the actual value of the particular threshold is configured by the network node, but it should belong to the value range associated with K. The UE is configured with K and the actual value(s) of the threshold(s) by the network node. But the configured values of threshold belong to the value range associated with the configured value of K.

In another example, only K is configured by the network node, but the actual value of the particular threshold is determined by the UE based on one or more criteria (e.g., TA value, DRX cycle, UE speed etc.). In this case as well, the threshold value(s) belong to the value range associated with the configured value of K.

For example, K can be configured based on the DRX cycle length. The value of K can increase with the DRX cycle length, i.e., increased DRX cycle length means that the time between compared measurements M1 and M2 can be quite long compared to the case with short DRX cycle lengths. An increase in time between M1 and M2 leads to a larger difference (e.g., magnitude) between the measured values of M1 and M2 assuming that the measurements are performed in the DRX ON durations and PUR is configured as function of DRX cycle lengths. In this case, it is preferable to use a K value which allows for a larger value range, e.g., K=2 instead of K=1. Similarly, a K value which allows for a shorter range can be used when DRX cycle lengths are rather short. This means the time between M1 and M2 is rather short, and therefore the difference in the measured value might also be short. In this case, a K value which is associated with a smaller value range is preferred. Similarly, the value range associated with K can also be configured based on the DRX cycle lengths. For same reason as described above, when the DRX cycle lengths are longer than in a reference case, it is advantageous to use a value range that covers a larger range, e.g., covering both negative and positive values, since the measurements may change quite a lot between M1 and M2. On the other hand, for shorter DRX cycles, another set of value ranges that covers e.g., shorter range compared to the previous can be selected. It may not necessarily contain any negative values.

In another example, K can be configured based on the mobility behavior of the UE which includes, for example, the UE speed, geographical location of the UE, UE direction of movement. If the information about the UE mobility behavior indicates that UE is expected to move quickly towards or away from the serving network node, which is expected to cause faster and/or larger measurement changes, then a K value which allows for a larger value range can be chosen. On the other hand, if the UE mobility behavior information indicates UE behavior is limited or not likely to cause big changes in the measurements, then a K value which allows for a smaller value range is selected.

Tables 1-3 show different examples of what the signaled parameters of H1, H2, and H4 may look like as function of K. Table 1 shows the case with a single threshold, i.e., the absolute difference between M1 and M2 is validated using a single threshold of H1. Tables 2 and 3 apply to the case when K=2, i.e., a minimum threshold (H2 as shown in Table 2) and a maximum threshold (H3 as shown in Table 3) are used for comparing to ΔRSRPmax.

TABLE 1

Value range for TA validation using serving cell measurement change when K < 2

| Signaled parameter | Value of H1 [dB] |
|---|---|
| '00' | 2 |
| '01' | 4 |
| '10' | 6 |
| '11' | 8 |

TABLE 2

Value range for H1 for TA validation using serving cell measurement change when K ≥ 2

| Signaled parameter | Value of H2 [dB] |
|---|---|
| '00' | −6 |
| '01' | −4 |
| '10' | −2 |
| '11' | 2 |

TABLE 3

Value range for H2 for TA validation using serving cell measurement change when K ≥ 2

| Signaled parameter | Value of H2 [dB] |
|---|---|
| '00' | 4 |
| '01' | 8 |
| '10' | 10 |
| '11' | 12 |

PUR can be used in both normal and enhanced coverage. The accuracy of the measured value depends largely on the coverage level. The absolute difference of RSRP measurement can be up to ±7 and ±10 in normal and enhanced coverage respectively. This means, in the worst case, the difference between M1 and M2 can be as large as 14 dB and 20 dB in normal and enhanced coverage respectively. In this case, the value range associated with K should include this range.

Another example of having a single table with a larger value range (e.g., common or global set of value ranges or superset of ranges) regardless of the number of thresholds can be specified. For example, a common value range to account for the case with both K=1 and K 2 is shown in FIG. 8, which illustrates a value range for TA validation using serving cell measurement change. In this case, depending on the value of K, a subset (S) of the values in FIG. 8 is applicable for determining the threshold value. For example when K=1, only a subset (S1) of the value ranges covering more positive values can be used for determining the threshold e.g., H1. On the other hand, when K 2, only another subset (S2) of value ranges or the entire set of the value ranges covering at least few negative values can be used for determining the thresholds e.g., H2 and H3. The association between the subset of value ranges within the common set of value ranges and the value of K (e.g., between S1 and K=1 and S2 and K=2) can be predefined or configured at the UE by the network node. In one example, the threshold value (e.g., H1) out of set S1 for K=1 or the two threshold values (e.g., H2 and H3) out of set S1 for K=2 is determined by the network and signaled to the UE. In another example, the threshold value (e.g., H1) out of set S1 for K=1 or the two threshold values (e.g., H2 and H3) out of set S1 for K=2 is determined by the UE based on one or more criteria (e.g., TA value, DRX cycle, UE speed etc.).

Step 604: In some embodiments of this step, the UE is performing the TA validation using obtained information, i.e., using the number of threshold information and the value range associated with it.

If the ΔSSmax (e.g., \RSRPmax) fulfills the conditions on the value range as described in Step 602, then TA is considered valid and UE is allowed the carry out the PUR transmission. Otherwise, TA is considered invalid and UE is not allowed to carry out the PUR transmission.

Additional embodiments for methods in a network node are disclosed. The steps included in some of these embodiments relate to the network node NW1, which is serving the UEs in a first cell (also known as cell1) shown in FIG. 7 and summarized below. In some embodiments, a method performed by a base station for validating parameters includes at least one of: obtaining one or more configuration parameters that may affect the measurements of a wireless device (step 700); and configuring the wireless device with a number of thresholds and associated thresholds for validating one or more parameters (step 702). In some embodiments, the one or more parameters comprise a TA parameter for a PUR transmission. However, the present disclosure is not limited thereto. Specific examples of NW1 are eNB, gNB, base station. This is only an exemplary embodiment and the present disclosure is not limited thereto.

Figure 7:
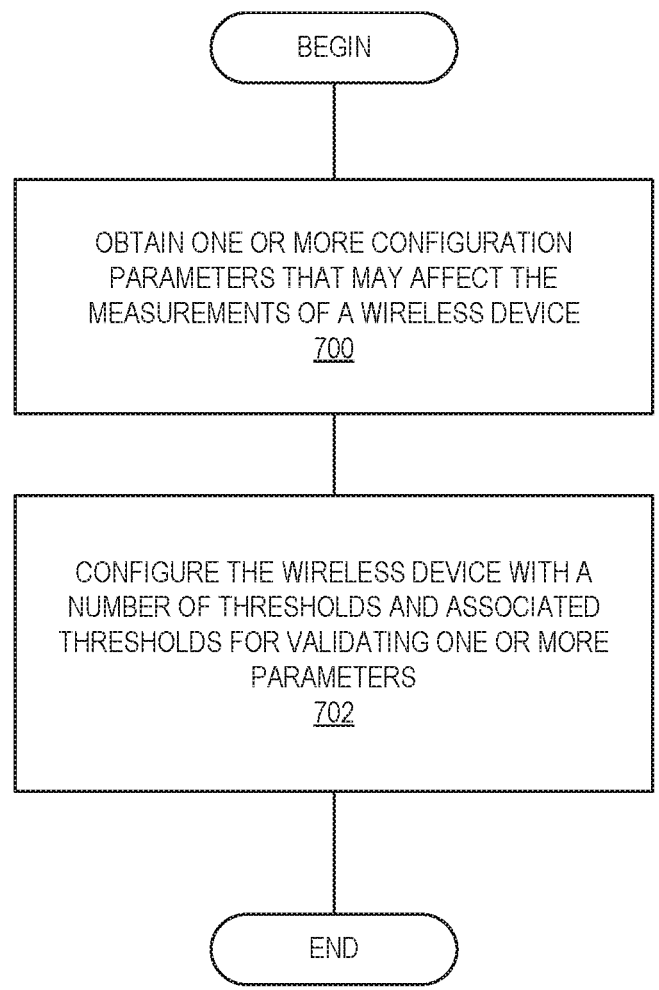
FIG. 7 illustrates a method performed by a base station for validating parameters, according to some embodiments of the present disclosure.

The steps involved in this network node embodiment are illustrated in FIG. 7 with additional details as follows:

Step 700: Obtaining configuration parameters that may affect the measurements of the UE Step 702: Configuring the UE with number of thresholds and associated thresholds for validating the TA The steps are described in more detail below.

Step 700: In some embodiments of this step, the network node is obtaining configuration parameters that may affect the measurements of the UE. In some embodiments, the configuration parameters include one or more of:

DRX cycle lengths
PUR configuration
UE speed
UE direction of movement
Geographical location of the UE All these parameters may affect the measurements in one or more ways. More specifically, the difference between the first measurement (M1) and the second measurement (M2) may increase depending on these configuration parameters.

The description about how PUR configuration, DRX cycle lengths, UE speed, UE direction of movement and geographical location of the UE affect the measurements of the UE, more specifically the difference between M1 and M2 apply also here.

Step 702: In some embodiments of this step, the network node is determining and configuring the UE with the number of thresholds (K) and associated thresholds used for validating the TA.

The step is similar to those described in step 602 of the UE embodiments described above. Any variations discussed above can also apply to embodiments of this step.

Figure 9:
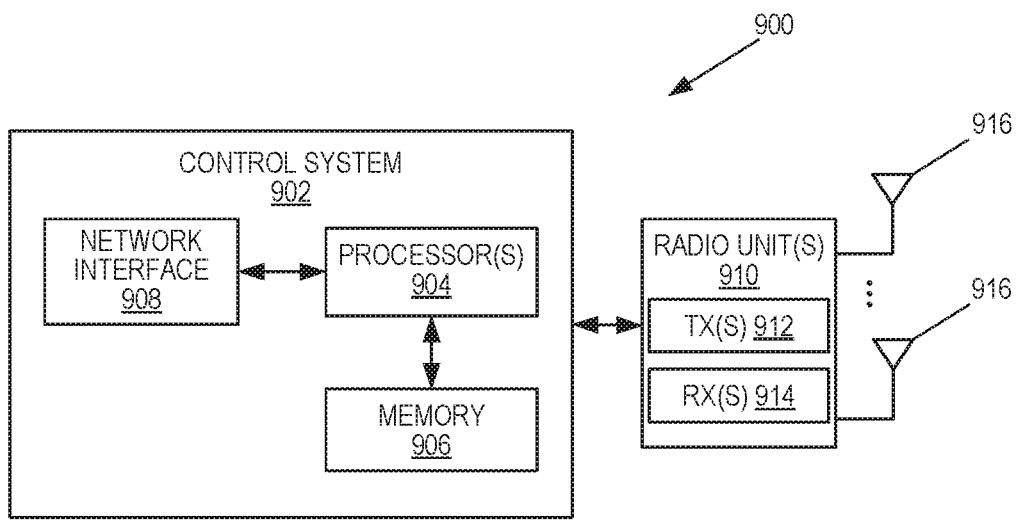
FIG. 9 is a schematic block diagram of a network node according to some embodiments of the present disclosure.

FIG. 9 is a schematic block diagram of a radio access node 900 according to some embodiments of the present disclosure. The radio access node 900 may be, for example, a base station 302 or 306. As illustrated, the radio access node 900 includes a control system 902 that includes one or more processors 904 (e.g., Central Processing Units (CPUs), Application Specific Integrated Circuits (ASICs), Field Programmable Gate Arrays (FPGAs), and/or the like), memory 906, and a network interface 908. The one or more processors 904 are also referred to herein as processing circuitry. In addition, the radio access node 900 includes one or more radio units 910 that each includes one or more transmitters 912 and one or more receivers 914 coupled to one or more antennas 916. The radio units 910 may be referred to or be part of radio interface circuitry. In some embodiments, the radio unit(s) 910 is external to the control system 902 and connected to the control system 902 via, e.g., a wired connection (e.g., an optical cable). However, in some other embodiments, the radio unit(s) 910 and potentially the antenna(s) 916 are integrated together with the control system 902. The one or more processors 904 operate to provide one or more functions of a radio access node 900 as described herein. In some embodiments, the function(s) are implemented in software that is stored, e.g., in the memory 906 and executed by the one or more processors 904.

Figure 10:
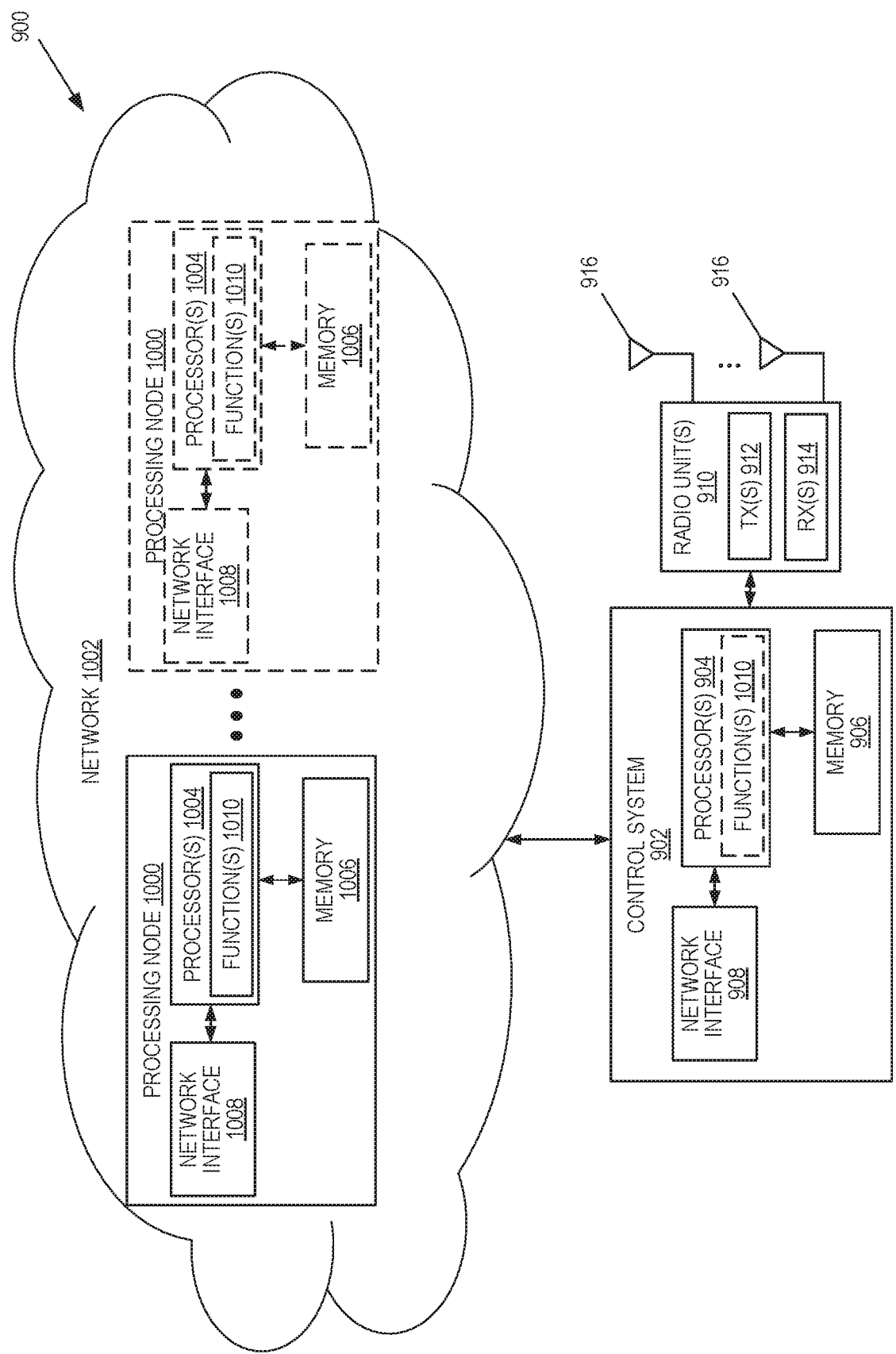
FIG. 10 is a schematic block diagram that illustrates a virtualized embodiment of the radio access node, according to some embodiments of the present disclosure.

FIG. 10 is a schematic block diagram that illustrates a virtualized embodiment of the radio access node 900 according to some embodiments of the present disclosure. This discussion is equally applicable to other types of network nodes. Further, other types of network nodes may have similar virtualized architectures.

As used herein, a "virtualized" radio access node is an implementation of the radio access node 900 in which at least a portion of the functionality of the radio access node 900 is implemented as a virtual component(s) (e.g., via a virtual machine(s) executing on a physical processing node (s) in a network(s)). As illustrated, in this example, the radio access node 900 includes the control system 902 that includes the one or more processors 904 (e.g., CPUs, ASICs, FPGAs, and/or the like), the memory 906, and the network interface 908 and the one or more radio units 910 that each includes the one or more transmitters 912 and the one or more receivers 914 coupled to the one or more antennas 916, as described above. The control system 902 is connected to the radio unit(s) 910 via, for example, an optical cable or the like. The control system 902 is connected to one or more processing nodes 1000 coupled to or included as part of a network(s) 1002 via the network interface 908. Each processing node 1000 includes one or more processors 1004 (e.g., CPUs, ASICs, FPGAs, and/or the like), memory 1006, and a network interface 1008.

In this example, functions 1010 of the radio access node 900 described herein are implemented at the one or more processing nodes 1000 or distributed across the control system 902 and the one or more processing nodes 1000 in any desired manner. In some particular embodiments, some or all of the functions 1010 of the radio access node 900 described herein are implemented as virtual components executed by one or more virtual machines implemented in a virtual environment(s) hosted by the processing node(s) 1000. As will be appreciated by one of ordinary skill in the art, additional signaling or communication between the processing node(s) 1000 and the control system 902 is used in order to carry out at least some of the desired functions 1010. Notably, in some embodiments, the control system 902 may not be included, in which case the radio unit(s) 910 communicate directly with the processing node(s) 1000 via an appropriate network interface(s).

In some embodiments, a computer program including instructions which, when executed by at least one processor, causes the at least one processor to carry out the functionality of radio access node 900 or a node (e.g., a processing node 1000) implementing one or more of the functions 1010 of the radio access node 900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
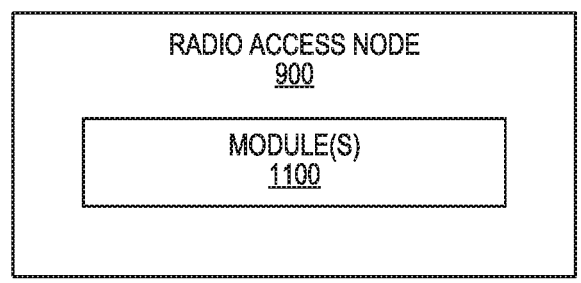
FIG. 11 is a schematic block diagram of the network node, according to some other embodiments of the present disclosure.

FIG. 11 is a schematic block diagram of the radio access node 900 according to some other embodiments of the present disclosure. The radio access node 900 includes one or more modules 1100, each of which is implemented in software. The module(s) 1100 provide the functionality of the radio access node 900 described herein. This discussion is equally applicable to the processing node 1000 of FIG. 10 where the modules 1100 may be implemented at one of the processing nodes 1000 or distributed across multiple processing nodes 1000 and/or distributed across the processing node(s) 1000 and the control system 902.

Figure 12:
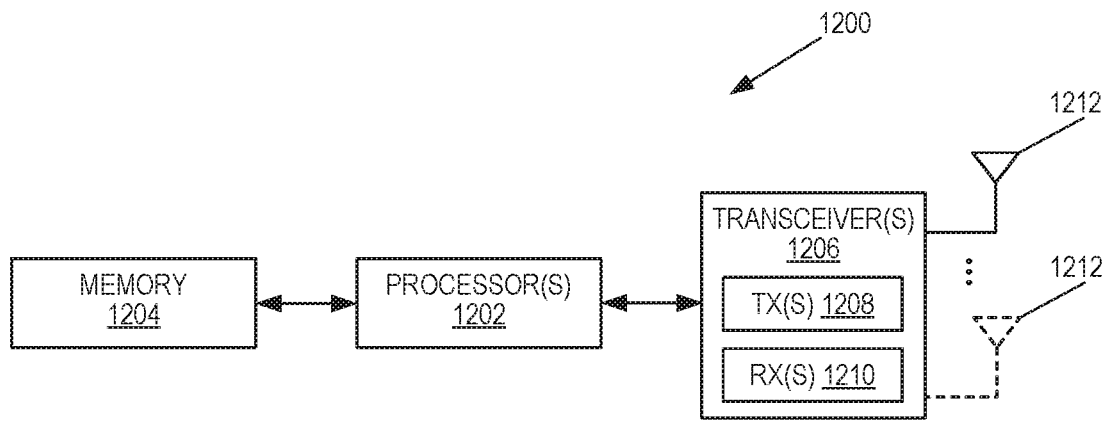
FIG. 12 is a schematic block diagram of a UE, according to some embodiments of the present disclosure.

FIG. 12 is a schematic block diagram of a UE 1200 according to some embodiments of the present disclosure. As illustrated, the UE 1200 includes one or more processors 1202 (e.g., CPUs, ASICs, FPGAs, and/or the like), memory 1204, and one or more transceivers 1206 each including one or more transmitters 1208 and one or more receivers 1210 coupled to one or more antennas 1212. The transceiver(s) 1206 includes radio-front end circuitry connected to the antenna(s) 1212 that is configured to condition signals communicated between the antenna(s) 1212 and the processor(s) 1202, as will be appreciated by on of ordinary skill in the art. The processors 1202 are also referred to herein as processing circuitry. The transceivers 1206 are also referred to herein as radio circuitry. In some embodiments, the functionality of the UE 1200 described above may be fully or partially implemented in software that is, e.g., stored in the memory 1204 and executed by the processor(s) 1202. Note that the UE 1200 may include additional components not illustrated in FIG. 12 such as, e.g., one or more user interface components (e.g., an input/output interface including a display, buttons, a touch screen, a microphone, a speaker(s), and/or the like and/or any other components for allowing input of information into the UE 1200 and/or allowing output of information from the UE 1200), a power supply (e.g., a battery and associated power circuitry), etc.

In some embodiments, a computer program including instructions which, when executed by at least one processor, causes the at least one processor to carry out the functionality of the UE 1200 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
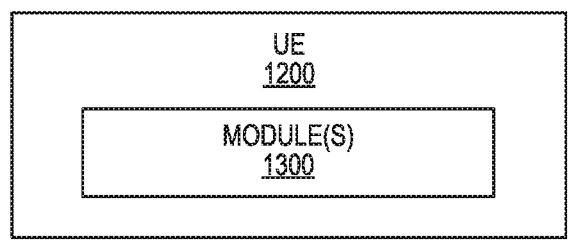
FIG. 13 is a schematic block diagram of the UE, according to some embodiments of the present disclosure.

FIG. 13 is a schematic block diagram of the UE 1200 according to some other embodiments of the present disclosure. The UE 1200 includes one or more modules 1300, each of which is implemented in software. The module(s) 1300 provide the functionality of the UE 1200 described herein.

Figure 14:
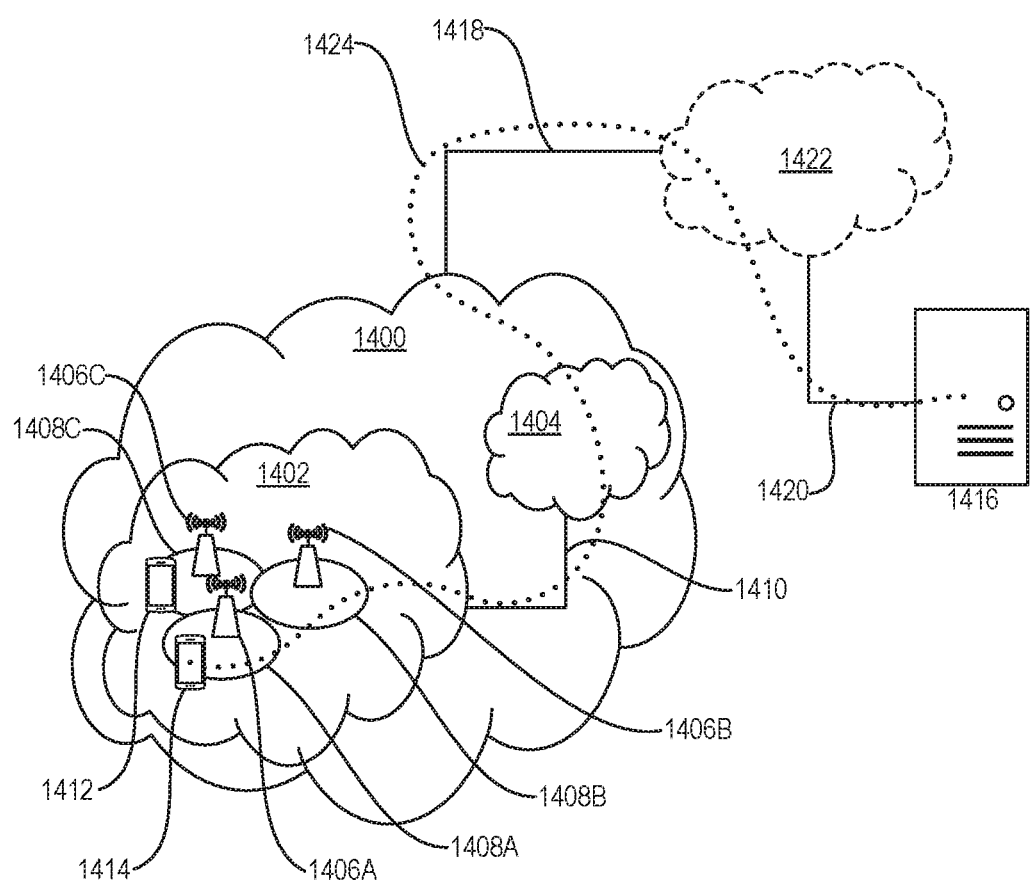
FIGS. 14 and 15 illustrate examples of a cellular communications system, according to some embodiments of the present disclosure.

With reference to FIG. 14, in accordance with an embodiment, a communication system includes a telecommunication network 1400, such as a 3GPP-type cellular network, which comprises an access network 1402, such as a RAN, and a core network 1404. The access network 1402 comprises a plurality of base stations 1406A, 1406B, 1406C, such as Node Bs, eNBs, gNBs, or other types of wireless Access Points (APs), each defining a corresponding coverage area 1408A, 1408B, 1408C. Each base station 1406A, 1406B, 1406C is connectable to the core network 1404 over a wired or wireless connection 1410. A first UE 1412 located in coverage area 1408C is configured to wirelessly connect to, or be paged by, the corresponding base station 1406C. A second UE 1414 in coverage area 1408A is wirelessly connectable to the corresponding base station 1406A. While a plurality of UEs 1412, 1414 are illustrated in this example, the disclosed embodiments are equally applicable to a situation where a sole UE is in the coverage area or where a sole UE is connecting to the corresponding base station 1406.

The telecommunication network 1400 is itself connected to a host computer 1416, which may be embodied in the hardware and/or software of a standalone server, a cloud-implemented server, a distributed server, or as processing resources in a server farm. The host computer 1416 may be under the ownership or control of a service provider, or may be operated by the service provider or on behalf of the service provider. Connections 1418 and 1420 between the telecommunication network 1400 and the host computer 1416 may extend directly from the core network 1404 to the host computer 1416 or may go via an optional intermediate network 1422. The intermediate network 1422 may be one of, or a combination of more than one of, a public, private, or hosted network; the intermediate network 1422, if any, may be a backbone network or the Internet; in particular, the intermediate network 1422 may comprise two or more sub-networks (not shown).

The communication system of FIG. 14 as a whole enables connectivity between the connected UEs 1412, 1414 and the host computer 1416. The connectivity may be described as an Over-the-Top (OTT) connection 1424. The host computer 1416 and the connected UEs 1412, 1414 are configured to communicate data and/or signaling via the OTT connection 1424, using the access network 1402, the core network 1404, any intermediate network 1422, and possible further infrastructure (not shown) as intermediaries. The OTT connection 1424 may be transparent in the sense that the participating communication devices through which the OTT connection 1424 passes are unaware of routing of uplink and downlink communications. For example, the base station 1406 may not or need not be informed about the past routing of an incoming downlink communication with data originating from the host computer 1416 to be forwarded (e.g., handed over) to a connected UE 1412. Similarly, the base station 1406 need not be aware of the future routing of an outgoing uplink communication originating from the UE 1412 towards the host computer 1416.

Example implementations, in accordance with an embodiment, of the UE, base station, and host computer discussed in the preceding paragraphs will now be described with reference to FIG. 15. In a communication system 1500, a host computer 1502 comprises hardware 1504 including a communication interface 1506 configured to set up and maintain a wired or wireless connection with an interface of a different communication device of the communication system 1500. The host computer 1502 further comprises processing circuitry 1508, which may have storage and/or processing capabilities. In particular, the processing circuitry 1508 may comprise one or more programmable processors, ASICs, FPGAs, or combinations of these (not shown) adapted to execute instructions. The host computer 1502 further comprises software 1510, which is stored in or accessible by the host computer 1502 and executable by the processing circuitry 1508. The software 1510 includes a host application 1512. The host application 1512 may be operable to provide a service to a remote user, such as a UE 1514 connecting via an OTT connection 1516 terminating at the UE 1514 and the host computer 1502. In providing the service to the remote user, the host application 1512 may provide user data which is transmitted using the OTT connection 1516.

The communication system 1500 further includes a base station 1518 provided in a telecommunication system and comprising hardware 1520 enabling it to communicate with the host computer 1502 and with the UE 1514. The hardware 1520 may include a communication interface 1522 for setting up and maintaining a wired or wireless connection with an interface of a different communication device of the communication system 1500, as well as a radio interface 1524 for setting up and maintaining at least a wireless connection 1526 with the UE 1514 located in a coverage area (not shown in FIG. 15) served by the base station 1518. The communication interface 1522 may be configured to facilitate a connection 1528 to the host computer 1502. The connection 1528 may be direct or it may pass through a core network (not shown in FIG. 15) of the telecommunication system and/or through one or more intermediate networks outside the telecommunication system. In the embodiment shown, the hardware 1520 of the base station 1518 further includes processing circuitry 1530, which may comprise one or more programmable processors, ASICs, FPGAs, or combinations of these (not shown) adapted to execute instructions. The base station 1518 further has software 1532 stored internally or accessible via an external connection.

The communication system 1500 further includes the UE 1514 already referred to. The UE's 1514 hardware 1534 may include a radio interface 1536 configured to set up and maintain a wireless connection 1526 with a base station serving a coverage area in which the UE 1514 is currently located. The hardware 1534 of the UE 1514 further includes processing circuitry 1538, which may comprise one or more programmable processors, ASICs, FPGAs, or combinations of these (not shown) adapted to execute instructions. The UE 1514 further comprises software 1540, which is stored in or accessible by the UE 1514 and executable by the processing circuitry 1538. The software 1540 includes a client application 1542. The client application 1542 may be operable to provide a service to a human or non-human user via the UE 1514, with the support of the host computer 1502. In the host computer 1502, the executing host application 1512 may communicate with the executing client application 1542 via the OTT connection 1516 terminating at the UE 1514 and the host computer 1502. In providing the service to the user, the client application 1542 may receive request data from the host application 1512 and provide user data in response to the request data. The OTT connection 1516 may transfer both the request data and the user data. The client application 1542 may interact with the user to generate the user data that it provides.

Figure 15:
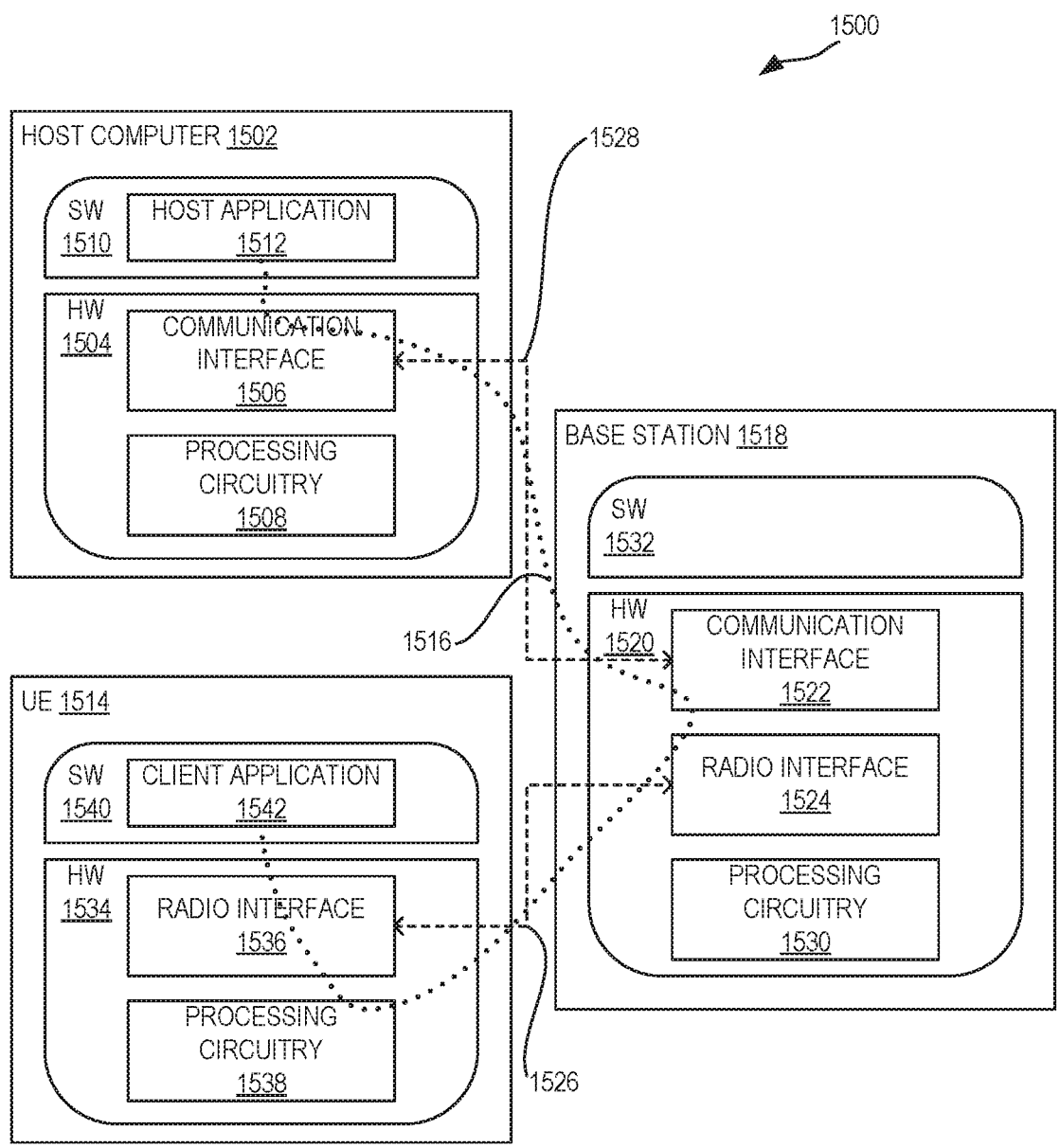

It is noted that the host computer 1502, the base station 1518, and the UE 1514 illustrated in FIG. 15 may be similar or identical to the host computer 1416, one of the base stations 1406A, 1406B, 1406C, and one of the UEs 1412, 1414 of FIG. 14, respectively. This is to say, the inner workings of these entities may be as shown in FIG. 15 and independently, the surrounding network topology may be that of FIG. 14.

In FIG. 15, the OTT connection 1516 has been drawn abstractly to illustrate the communication between the host computer 1502 and the UE 1514 via the base station 1518 without explicit reference to any intermediary devices and the precise routing of messages via these devices. The network infrastructure may determine the routing, which may be configured to hide from the UE 1514 or from the service provider operating the host computer 1502, or both. While the OTT connection 1516 is active, the network infrastructure may further take decisions by which it dynamically changes the routing (e.g., on the basis of load balancing consideration or reconfiguration of the network).

The wireless connection 1526 between the UE 1514 and the base station 1518 is in accordance with the teachings of the embodiments described throughout this disclosure. One or more of the various embodiments improve the performance of OTT services provided to the UE 1514 using the OTT connection 1516, in which the wireless connection 1526 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 1516 between the host computer 1502 and the UE 1514, in response to variations in the measurement results. The measurement procedure and/or the network functionality for reconfiguring the OTT connection 1516 may be implemented in the software 1510 and the hardware 1504 of the host computer 1502 or in the software 1540 and the hardware 1534 of the UE 1514, or both. In some embodiments, sensors (not shown) may be deployed in or in association with communication devices through which the OTT connection 1516 passes; the sensors may participate in the measurement procedure by supplying values of the monitored quantities exemplified above, or supplying values of other physical quantities from which the software 1510, 1540 may compute or estimate the monitored quantities. The reconfiguring of the OTT connection 1516 may include message format, retransmission settings, preferred routing, etc.; the reconfiguring need not affect the base station 1518, and it may be unknown or imperceptible to the base station 1518. Such procedures and functionalities may be known and practiced in the art. In certain embodiments, measurements may involve proprietary UE signaling facilitating the host computer 1502's measurements of throughput, propagation times, latency, and the like. The measurements may be implemented in that the software 1510 and 1540 causes messages to be transmitted, in particular empty or 'dummy' messages, using the OTT connection 1516 while it monitors propagation times, errors, etc.

FIG. 16 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 16 will be included in this section. In step 1600, the host computer provides user data. In sub-step 1602 (which may be optional) of step 1600, the host computer provides the user data by executing a host application. In step 1604, the host computer initiates a transmission carrying the user data to the UE. In step 1606 (which may be optional), the base station transmits to the UE the user data which was carried in the transmission that the host computer initiated, in accordance with the teachings of the embodiments described throughout this disclosure. In step 1608 (which may also be optional), the UE executes a client application associated with the host application executed by the host computer.

FIG. 17 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 17 will be included in this section. In step 1700 of the method, the host computer provides user data. In an optional sub-step (not shown) the host computer provides the user data by executing a host application. In step 1702, the host computer initiates a transmission carrying the user data to the UE. The transmission may pass via the base station, in accordance with the teachings of the embodiments described throughout this disclosure. In step 1704 (which may be optional), the UE receives the user data carried in the transmission.

FIG. 18 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 18 will be included in this section. In step 1800 (which may be optional), the UE receives input data provided by the host computer. Additionally or alternatively, in step 1802 (which may be optional), the UE provides user data. In sub-step 1804 (which may be optional) of step 1800, the UE provides the user data by executing a client application. In sub-step 1806 (which may be optional) of step 1802, the UE executes a client application which provides the user data in reaction to the received input data provided by the host computer. In providing the user data, the executed client application may further consider user input received from the user. Regardless of the specific manner in which the user data was provided, the UE initiates, in sub-step 1808 (which may be optional), transmission of the user data to the host computer. In step 1810 of the method, the host computer receives the user data transmitted from the UE, in accordance with the teachings of the embodiments described throughout this disclosure.

FIG. 19 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 19 will be included in this section. In step 1900 (which may be optional), in accordance with the teachings of the embodiments described throughout this disclosure, the base station receives user data from the UE. In step 1902 (which may be optional), the base station initiates transmission of the received user data to the host computer. In step 1904 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

Group A Embodiments

Embodiment 1: A method performed by a wireless device for adapting thresholds for validating parameters, the method comprising at least one of: obtaining (600) information about measurement change for validating one or more parameters; obtaining (602) information about a number of thresholds (K) and associated thresholds used for validating the one or more parameters; and performing (604) parameter validation based on the obtained information.

Embodiment 2: The method of the previous embodiment wherein the one or more parameters comprises a Timing Advance, TA, parameter for a Preconfigured Uplink Resources, PUR, transmission.

Embodiment 3: The method of any of embodiments 1 to 2 wherein performing parameter validation comprises performing parameter validation based on a maximum allowed variation in signal strength (SSmax) in a serving cell.

Embodiment 4: The method of any of embodiments 1 to 3 wherein SSmax comprises one or more of a change in RSRP (RSRPmax) and a change in path loss (·PLmax).

Embodiment 5: The method of any of embodiments 1 to 4 wherein SSmax can be derived using M1 and M2 using one or more functions such as: absolute difference between M1 and M2, magnitude of M1 and M2, fraction between M1 and M2, average, minimum, and maximum.

Embodiment 6: The method of any of embodiments 1 to 5 wherein obtaining information about a number of thresholds (K) comprises obtaining the information from a network node.

Embodiment 7: The method of any of embodiments 1 to 5 wherein obtaining information about a number of thresholds (K) comprises obtaining the information by the wireless device based on predefined rule.

Embodiment 8: The method of embodiment 7 wherein the predefined rule comprises one or more of: a. K depends on coverage enhancement level of the wireless device with respect to the serving cell (e.g., K=1 in normal coverage and K=2 in enhanced coverage); and b. K depends on received signal level of the wireless device with respect to the serving cell (e.g., K=2 if SNR is less than or equal to SNR threshold and K=1 if SNR is above SNR threshold).

Embodiment 9: The method of any of embodiments 1 to 2 wherein values of K can be 1, 2, 3 etc. and each threshold is associated with a certain value range that the wireless device uses for validating the parameter.

Embodiment 10: The method of any of embodiments 1 to 9 wherein performing parameter validation comprises performing parameter validation based on: a. a first threshold (H1) which belongs to a first value range (R1) if K=1, (i.e., H1 R1; and b. a second threshold (H2) and third threshold (H3) which belong to a second value range (R2) if K=2, (i.e., H2 R2 and also H3 R2.

Embodiment 11: The method of any of embodiments 1 to 10 wherein the actual value of the particular threshold is configured by the network node but it should belong to the value range associated with K.

Embodiment 12: The method of any of embodiments 1 to 11 wherein only K is configured by the network node, but the actual value of the particular threshold is determined by the wireless device based on one or more criteria (e.g., TA value, DRX cycle, wireless device speed etc.).

Embodiment 13: The method of any of embodiments 1 to 12 wherein, if the ·SSmax (e.g., ·RSRPmax) fulfills the conditions on value range, then the TA is considered valid and the wireless device is allowed the carry out the PUR transmission, otherwise, the TA is considered invalid and the wireless device is not allowed to carry out the PUR transmission.

Embodiment 14: The method of any of the previous embodiments, further comprising: providing user data; and forwarding the user data to a host computer via the transmission to the base station.

Group B Embodiments

Embodiment 15: A method performed by a base station for adapting thresholds for validating parameters, the method comprising at least one of: obtaining (700) one or more configuration parameters that may affect the measurements of a wireless device; and configuring (702) the wireless device with a number of thresholds and associated thresholds for validating one or more parameters.

Embodiment 16: The method of the previous embodiment wherein the one or more parameters comprises a Timing Advance, TA, parameter for a Preconfigured Uplink Resources, PUR, transmission.

Embodiment 17: The method of any of embodiments 15 to 16 wherein performing parameter validation comprises performing parameter validation based on a maximum allowed variation in signal strength (·SSmax) in a serving cell.

Embodiment 18: The method of any of embodiments 15 to 17 wherein ·SSmax comprises one or more of a change in RSRP (·RSRPmax) and a change in path loss (·PLmax).

Embodiment 19: The method of any of embodiments 15 to 18 wherein ·SSmax can be derived using M1 and M2 using one or more functions such as: absolute difference between M1 and M2, magnitude of M1 and M2, fraction between M1 and M2, average, minimum, and maximum.

Embodiment 20: The method of any of embodiments 15 to 19 wherein configuring the wireless device with a number of thresholds (K) comprises transmitting the information to the wireless device.

Embodiment 21: The method of any of embodiments 15 to 20 wherein configuring the wireless device with a number of thresholds (K) comprises the wireless device using a predefined rule.

Embodiment 22: The method of embodiment 21 wherein the predefined rule comprises one or more of: a. K depends on coverage enhancement level of the wireless device with respect to the serving cell (e.g., K=1 in normal coverage and K=2 in enhanced coverage); and b. K depends on received signal level of the wireless device with respect to the serving cell (e.g., K=2 if SNR is less than or equal to SNR threshold and K=1 if SNR is above SNR threshold).

Embodiment 23: The method of any of embodiments 15 to 22 wherein values of K can be 1, 2, 3 etc. and each threshold is associated with a certain value range that the wireless device uses for validating the parameter.

Embodiment 24: The method of any of embodiments 15 to 23 wherein the wireless device performing parameter validation comprises performing parameter validation based on: a. a first threshold (H1) which belongs to a first value range (R1) if K=1, (i.e., H1·R1; and b. a second threshold (H2) and third threshold (H3) which belong to a second value range (R2) if K=2, (i.e., H2·R2 and also H3·R2.

Embodiment 25: The method of any of embodiments 15 to 24 wherein the actual value of the particular threshold is configured by the base station but it should belong to the value range associated with K.

Embodiment 26: The method of any of embodiments 15 to 25 wherein only K is configured by the base station, but the actual value of the particular threshold is determined by the wireless device based on one or more criteria (e.g., TA value, DRX cycle, wireless device speed etc.).

Embodiment 27: The method of any of embodiments 15 to 26 wherein, if the SSmax (e.g., RSRPmax) fulfills the conditions on value range, then the TA is considered valid and the wireless device is allowed the carry out the PUR transmission, otherwise, the TA is considered invalid and the wireless device is not allowed to carry out the PUR transmission.

Embodiment 28: The method of any of embodiments 15 to 27 wherein the one or more configuration parameters that may affect the measurements of a wireless device comprise one or more of: a. DRX cycle lengths; b. PUR configuration; c. wireless device speed; d. wireless device direction of movement; and e. geographical location of the wireless device.

Embodiment 29: The method of any of the previous embodiments, further comprising: obtaining user data; and forwarding the user data to a host computer or a wireless device.

Group C Embodiments

Embodiment 30: A wireless device for adapting thresholds for validating parameters, the wireless device comprising: processing circuitry configured to perform any of the steps of any of the Group A embodiments; and power supply circuitry configured to supply power to the wireless device.

Embodiment 31: A base station for adapting thresholds for validating parameters, the base station comprising: processing circuitry configured to perform any of the steps of any of the Group B embodiments; and power supply circuitry configured to supply power to the base station.

Embodiment 32: A User Equipment, UE, for adapting thresholds for validating parameters, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 33: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 34: The communication system of the previous embodiment further including the base station.

Embodiment 35: The communication system of the previous 2 embodiments, further including the UE, wherein the UE is configured to communicate with the base station.

Embodiment 36: The communication system of the previous 3 embodiments, wherein: the processing circuitry of the host computer is configured to execute a host application, thereby providing the user data; and the UE comprises processing circuitry configured to execute a client application associated with the host application.

Embodiment 37: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 38: The method of the previous embodiment, further comprising, at the base station, transmitting the user data.

Embodiment 39: The method of the previous 2 embodiments, wherein the user data is provided at the host computer by executing a host application, the method further comprising, at the UE, executing a client application associated with the host application.

Embodiment 40: A User Equipment, UE, configured to communicate with a base station, the UE comprising a radio interface and processing circuitry configured to perform the method of the previous 3 embodiments.

Embodiment 41: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 42: The communication system of the previous embodiment, wherein the cellular network further includes a base station configured to communicate with the UE.

Embodiment 43: The communication system of the previous 2 embodiments, wherein: the processing circuitry of the host computer is configured to execute a host application, thereby providing the user data; and the UE's processing circuitry is configured to execute a client application associated with the host application.

Embodiment 44: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 45: The method of the previous embodiment, further comprising at the UE, receiving the user data from the base station.

Embodiment 46: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 47: The communication system of the previous embodiment, further including the UE.

Embodiment 48: The communication system of the previous 2 embodiments, further including the base station, wherein the base station comprises a radio interface configured to communicate with the UE and a communication interface configured to forward to the host computer the user data carried by a transmission from the UE to the base station.

Embodiment 49: The communication system of the previous 3 embodiments, wherein: the processing circuitry of the host computer is configured to execute a host application; and the UE's processing circuitry is configured to execute a client application associated with the host application, thereby providing the user data.

Embodiment 50: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 51: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 52: The method of the previous embodiment, further comprising, at the UE, providing the user data to the base station.

Embodiment 53: The method of the previous 2 embodiments, further comprising: at the UE, executing a client application, thereby providing the user data to be transmitted; and at the host computer, executing a host application associated with the client application.

Embodiment 54: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 55: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 56: The communication system of the previous embodiment further including the base station.

Embodiment 57: The communication system of the previous 2 embodiments, further including the UE, wherein the UE is configured to communicate with the base station.

Embodiment 58: The communication system of the previous 3 embodiments, wherein: the processing circuitry of the host computer is configured to execute a host application; and the UE is configured to execute a client application associated with the host application, thereby providing the user data to be received by the host computer.

Embodiment 59: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 60: The method of the previous embodiment, further comprising at the base station, receiving the user data from the UE.

Embodiment 61: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
BSC Base Station Controller
BTS Base Transceiver Station
CE Coverage Enhancement
CPU Central Processing Unit
CRS Cell Specific Reference Signal
DL Downlink
DN Data Network
DRX Discontinuous Reception
DSP Digital Signal Processor
ECL Extended Coverage Level
eDRX Enhanced Discontinuous Reecption
eMTC Enhanced Machine Type Communication
eNB Enhanced or Evolved Node B
ePDCCH Enhanced Physical Downlink Control Channel
EPS Evolved Packet System
E-SMLC Evolved Serving Mobile Location Center
FPGA Field Programmable Gate Array
gNB New Radio Base Station
HARQ Hybrid Automatic Repeat Request
HSS Home Subscriber Server
IoT Internet of Things
IP Internet Protocol
LTE Long Term Evolution
MAC Medium Access Control
MCG Master Cell Group
MME Mobility Management Entity
MPDCCH Massive Physical Downlink Control Channel
MSR Multi-Standard Radio
MTC Machine Type Communication
NB-IoT Narrowband Internet of Things NCL Normal Coverage Level
NEF Network Exposure Function
NF Network Function
NPDCCH Narrowband Physical Downlink Control Channel
NPRACH New Physical Random Access Channel
NPUSCH Narrowband Physical Uplink Shared Channel
NR New Radio
NRF Network Function Repository Function
NRSRP Narrowband Reference Signal Received Power
NSSF Network Slice Selection Function
OTT Over-the-Top
PC Personal Computer
PCF Policy Control Function
P-GW Packet Data Network Gateway
PL Pathloss
PRB Physical Resource Block
PTW Paging Time Window
PUR Preconfigured Uplink Resource
PUSCH Physical Uplink Shared Channel
QoS Quality of Service
RAM Random Access Memory
RAN Radio Access Network
RB Resource Block
RE Resource Element
RNC Radio Network Controller
ROM Read Only Memory
RRC Radio Resource Control
RRH Remote Radio Head
RRM Radio Resource Management
RRU Remote Radio Unit
RSRP Reference Signal Received Power
RTT Round Trip Time
SCEF Service Capability Exposure Function
SCG Secondary Cell Group
SCH Shared Channel
SMF Session Management Function
SNR Signal to Noise Ratio
TA Timing Advance
TAT Time Alignment Timer
TTI Time Transmission Interval
UDM Unified Data Management
UE User Equipment
UL Uplink
UPF User Plane Function Those skilled in the art will recognize improvements and modifications to the embodiments of the present disclosure. All such improvements and modifications are considered within the scope of the concepts disclosed herein.

What is claimed is:

1. A method performed by a wireless device for validating one or more parameters, the method comprising:
obtaining information about measurement change for validating the one or more parameters;
obtaining information about a number of thresholds (K) and associated thresholds used for validating the one or more parameters; and
performing parameter validation based on the obtained information;
wherein a value of K is an integer and each threshold is associated with a certain value range that the wireless device uses for validating the parameter;
wherein performing the parameter validation comprises performing the parameter validation based on:
a first threshold (H1) which belongs to a first value range (R1) if K=1; and
a second threshold (H2) and a third threshold (H3) which belong to a second value range (R2) if K=2.

2. The method of claim 1 wherein the one or more parameters comprise a Timing Advance, TA, parameter for a Preconfigured Uplink Resources, PUR, transmission.

3. The method of claim 1 wherein performing the parameter validation comprises performing the parameter validation based on a maximum allowed variation in signal strength (ΔSSmax) in a serving cell.

4. The method of claim 1 wherein ΔSSmax comprises one or more of a change in Reference Signal Received Power, RSRP, (ΔRSRPmax) and a change in path loss (ΔPLmax).

5. The method of claim 1 wherein ΔSSmax can be derived using a first measurement (M1) and a second measurement (M2) using one or more functions chosen from the group consisting of: absolute difference between M1 and M2; magnitude of M1 and M2; fraction between M1 and M2; average of M1 and M2; minimum of M1 and M2; and maximum of M1 and M2.

6. The method of claim 1 wherein obtaining the information about the number of thresholds (K) comprises obtaining the information from a network node.

7. The method of claim 1 wherein obtaining the information about the number of thresholds (K) comprises obtaining the information by the wireless device based on a predefined rule.

8. The method of claim 7 wherein the predefined rule comprises one or more of the group consisting of:
K depends on a coverage enhancement level of the wireless device with respect to the serving cell; and
K depends on a received signal level of the wireless device with respect to the serving cell.

9. The method of claim 1 wherein an actual value of the particular threshold is configured by the network node but the actual value belongs to a value range associated with K.

10. The method of claim 1 wherein only K is configured by the network node, but an actual value of the particular threshold is determined by the wireless device based on one or more criteria.

11. The method of claim 10 wherein the one or more criteria comprise one or more of the group consisting of: a TA value; a Discontinuous Reception, DRX, cycle; and a wireless device speed.

12. The method of claim 1 wherein:
if the ΔSSmax fulfills conditions on the value range, then the TA is considered valid and the wireless device is allowed to carry out the PUR transmission; and
if the ΔSSmax does not fulfill conditions on the value range, the TA is considered invalid and the wireless device is not allowed to carry out the PUR transmission.

13. A method performed by a base station for configuring one or more parameters, the method comprising:
obtaining one or more configuration parameters that may affect measurements of a wireless device; and
configuring the wireless device with a number of thresholds (K) and associated thresholds for validating the one or more parameters based on the one or more configuration parameters;
wherein a value of K is an integer and each threshold is associated with a certain value range that the wireless device uses for validating the parameter;
wherein:
a first threshold (H1) which belongs to a first value range (R1) if K=1; and
a second threshold (H2) and a third threshold (H3) which belong to a second value range (R2) if K=2.

14. The method of claim 13 wherein the one or more parameters comprises a Timing Advance, TA, parameter for a Preconfigured Uplink Resources, PUR, transmission.

15. The method of claim 13 wherein performing parameter validation comprises performing the parameter validation based on a maximum allowed variation in signal strength (ΔSSmax) in a serving cell.

16. The method of claim 13 wherein ΔSSmax comprises one or more of a change in Reference Signal Received Power, RSRP, (ΔRSRPmax) and a change in path loss (ΔPLmax).

17. The method of claim 13 wherein ΔSSmax can be derived using a first measurement (M1) and a second measurement (M2) using one or more functions chosen from the group consisting of: absolute difference between M1 and M2; magnitude of M1 and M2; fraction between M1 and M2; average of M1 and M2; minimum of M1 and M2; and maximum of M1 and M2.

18. The method of claim 13 wherein configuring the wireless device with the number of thresholds (K) comprises transmitting information to the wireless device.

19. The method of claim 13 wherein configuring the wireless device with the number of thresholds (K) comprises the wireless device using a predefined rule.

20. The method of claim 19 wherein the predefined rule comprises one or more of the group consisting of:
   K depends on a coverage enhancement level of the wireless device with respect to the serving cell; and
   K depends on a received signal level of the wireless device with respect to the serving cell.

21. The method of claim 13 wherein an actual value of the particular threshold is configured by the base station but the actual value belongs to a value range associated with K.

22. The method of claim 13 wherein only K is configured by the base station, but the actual value of the particular threshold is determined by the wireless device based on one or more criteria.

23. The method of claim 13 wherein:
   if the ΔSSmax (e.g., ΔRSRPmax) fulfills the conditions on value range, then the TA is considered valid and the wireless device is allowed to carry out the PUR transmission; and
   if the ΔSSmax does not fulfill the conditions on the value range, the TA is considered invalid and the wireless device is not allowed to carry out the PUR transmission.

24. The method of claim 13 wherein the one or more configuration parameters that may affect the measurements of a wireless device comprise one or more of the group consisting of: Discontinuous Reception, DRX, cycle lengths; a PUR configuration; a wireless device speed; a wireless device direction of movement; and a geographical location of the wireless device.

25. A wireless device for validating one or more parameters, the wireless device comprising:
   one or more processors; and
   memory storing instructions executable by the one or more processors, whereby the wireless device is operable to:
      obtain information about a measurement change for validating the one or more parameters;
      obtain information about a number of thresholds (K) and associated thresholds used for validating the one or more parameters; and
      perform parameter validation based on the obtained information;
   wherein a value of K is an integer and each threshold is associated with a certain value range that the wireless device uses for validating the parameter;
   wherein performing the parameter validation comprises performing the parameter validation based on:
      a first threshold (H1) which belongs to a first value range (R1) if K=1; and
      a second threshold (H2) and a third threshold (H3) which belong to a second value range (R2) if K=2.

26. A base station for configuring one or more parameters, the base station comprising:
   one or more processors; and
   memory comprising instructions to cause the base station to:
      obtain one or more configuration parameters that may affect the measurements of a wireless device; and
      configure the wireless device with a number of thresholds (K) and associated thresholds for validating the one or more parameters based on the one or more configuration parameters;
   wherein a value of K is an integer and each threshold is associated with a certain value range that the wireless device uses for validating the parameter;
   wherein:
      a first threshold (H1) which belongs to a first value range (R1) if K=1; and
      a second threshold (H2) and a third threshold (H3) which belong to a second value range (R2) if K=2.

* * * * *